United States Patent
Hyodo et al.

(10) Patent No.: US 12,319,845 B2
(45) Date of Patent: Jun. 3, 2025

(54) AQUEOUS ADHESIVE FOR RUBBER AND AQUEOUS ADHESIVE FOR BALL

(71) Applicant: Sumitomo Rubber Industries, Ltd., Hyogo (JP)

(72) Inventors: Takehiko Hyodo, Kobe (JP); Masanori Taguchi, Kobe (JP); Hiroaki Tanaka, Kobe (JP); Fumiya Suzuki, Kobe (JP); Kunio Niwa, Kobe (JP); Kazuyoshi Shiga, Kobe (JP); Yuko Sakurai, Kobe (JP); Kohei Mimura, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 577 days.

(21) Appl. No.: 17/625,389

(22) PCT Filed: Jul. 27, 2020

(86) PCT No.: PCT/JP2020/028739
§ 371 (c)(1),
(2) Date: Jan. 7, 2022

(87) PCT Pub. No.: WO2021/024835
PCT Pub. Date: Feb. 11, 2021

(65) Prior Publication Data
US 2022/0275257 A1    Sep. 1, 2022

(30) Foreign Application Priority Data

Aug. 2, 2019  (JP) .................................. 2019-143271
Jul. 2, 2020  (JP) .................................. 2020-114554

(51) Int. Cl.
C09J 107/02 (2006.01)
A63B 39/08 (2006.01)
(Continued)

(52) U.S. Cl.
CPC ............. *C09J 107/02* (2013.01); *A63B 39/08* (2013.01); *C08K 3/06* (2013.01); *C08K 3/22* (2013.01);
(Continued)

(58) Field of Classification Search
CPC .. C09J 107/02; C09J 2301/30; C09J 2407/00; C09J 109/08; A63B 39/08;
(Continued)

(56) References Cited

U.S. PATENT DOCUMENTS

| | | | | |
|---|---|---|---|---|
| 4,592,550 A | * | 6/1986 | Horiuchi | B29D 22/04 |
| | | | | 525/236 |
| 6,127,476 A | * | 10/2000 | Jialanella | C09J 113/02 |
| | | | | 423/604 |
| 2006/0142420 A1 | * | 6/2006 | Nakazawa | B29C 73/166 |
| | | | | 523/166 |

FOREIGN PATENT DOCUMENTS

| | | |
|---|---|---|
| EP | 2083057 A1 | 7/2009 |
| GB | 1573488 * | 8/1980 |

(Continued)

OTHER PUBLICATIONS

Definition of "Filler" from Merriam-Webster.com (Year: 2025).*

*Primary Examiner* — Cynthia L Schaller
(74) *Attorney, Agent, or Firm* — Studebaker Brackett PLLC

(57) ABSTRACT

An aqueous adhesive for rubber includes rubber latex and an ammonium-salt-based vulcanization acceleration aid. An amount of the ammonium-salt-based vulcanization acceleration aid contained in the aqueous adhesive is preferably not less than 0.01% by weight and not greater than 5.0% by weight in terms of solid content. An aqueous adhesive for a ball includes rubber latex as a main component. A content of an inorganic filler in the aqueous adhesive is not greater than 0.1% by weight in terms of solid content. A ball 2 includes (Continued)

a hollow core 4 obtained by crosslinking a rubber composition that contains a vulcanizing agent. The core 4 is formed of two hemispherical half cores. The two half cores are adhered to each other by using the aqueous adhesive for a ball.

10 Claims, 4 Drawing Sheets

(51) Int. Cl.
    *A63B 102/02*     (2015.01)
    *C08K 3/06*     (2006.01)
    *C08K 3/22*     (2006.01)
    *C08K 3/36*     (2006.01)
    *C08K 5/19*     (2006.01)
    *C08K 5/44*     (2006.01)

(52) U.S. Cl.
    CPC .................. *C08K 3/36* (2013.01); *C08K 5/19* (2013.01); *C08K 5/44* (2013.01); *A63B 2102/02* (2015.10); *C08K 2003/2237* (2013.01); *C08K 2003/2296* (2013.01); *C09J 2301/30* (2020.08); *C09J 2407/00* (2013.01)

(58) Field of Classification Search
    CPC ...... A63B 2102/02; A63B 45/00; C08K 3/06; C08K 3/22; C08K 3/36; C08K 5/19; C08K 5/44; C08K 2003/2237; C08K 2003/2296; C08L 7/02; C08L 9/10
    See application file for complete search history.

(56) References Cited

FOREIGN PATENT DOCUMENTS

| | | |
|---|---|---|
| JP | S57-179265 A | 11/1982 |
| JP | S57-179266 A | 11/1982 |
| JP | S58-098372 A | 6/1983 |
| JP | 2000-309766 A | 11/2000 |
| JP | 2007-000167 A | 1/2007 |

* cited by examiner

AQUEOUS ADHESIVE FOR RUBBER AND AQUEOUS ADHESIVE FOR BALL

TECHNICAL FIELD

The present invention relates to aqueous adhesives. More specifically, the present invention relates to aqueous adhesives used for producing rubber products. Furthermore, the present invention relates to aqueous adhesives used for producing balls.

BACKGROUND ART

When rubber products are produced, a plurality of rubber members need to be adhered to each other, or a rubber member needs to be adhered to another material such as fiber, metal, or the like in some cases. Examples of the rubber product obtained by adhering a plurality of rubber members to each other include hollow balls that are widely used for various sports and training. One of such hollow balls is, for example, a tennis ball. A tennis ball has a core. The core is a hollow spherical body having an inside filled with gas. An outer peripheral surface of the core is covered with two pieces of dumbbell-shaped melton (felt). The melton is adhered to the outer peripheral surface of the core by using an adhesive.

In general, the hollow core is formed by adhering two hemispherical half cores to each other. An adhesive is also used for adhering the two half cores to each other. Each of the half cores is a rubber member formed by crosslinking a rubber composition. To date, a solvent-based adhesive in which a rubber component, a vulcanizing agent, a vulcanization accelerator, and the like are dissolved in an organic solvent has been used for adhering the two half cores to each other, from the viewpoint of affinity for the rubber member and adhesive strength.

In recent years, an aqueous adhesive that can replace the solvent-based adhesive has been examined from the viewpoint of influence on the environment and reduction of load on workers. JP57-179265 and JP57-179266 disclose, for example, a melton-seaming adhesive in which natural rubber latex having been depolymerized or synthetic rubber latex is used as a base material. In JP58-98372, a melton dumbbell adhesive in which a high-temperature decomposing vulcanizing agent is blended with rubber latex, is suggested.

JP2007-167 discloses a method for producing a tennis ball in which an adhesive layer between a core and a felt portion is formed by using an aqueous composition containing a polyacrylic acid metal salt. In JP2000-309766, a tennis ball cover adhesive in which a thiuram accelerator and a sulfenimide accelerator are blended with natural rubber latex, is suggested.

CITATION LIST

Patent Literature

Patent Literature 1: JP57-179265
Patent Literature 2: JP57-179266
Patent Literature 3: JP58-98372
Patent Literature 4: JP2007-167
Patent Literature 5: JP2000-309766

SUMMARY OF THE INVENTION

Problems to be Solved by the Invention

In tennis play, a ball is repeatedly hit. In a case where adhesive strength of an adhesive used for adhering half cores to each other is low, damage may be caused by the repeated hits. A ball in which the adhesive strength for adhering the half cores to each other is low has poor durability. Thus, an aqueous adhesive having excellent adhesive strength is required for producing rubber products for usage in which durability is required.

The aqueous adhesive disclosed in JP57-179265, JP57-179266, and JP2007-167 has a thiazole-based or dithiocarbamate vulcanization accelerator blended therein. In the adhesive suggested by JP2000-309766, a thiuram accelerator and a sulfenimide accelerator are used in combination. Curing rates of these aqueous adhesives are very high. In an aqueous adhesive having an excessively high curing rate, the fluidity is reduced early. Therefore, the entire adhesion surface between the rubber members cannot be sufficiently adhered to each other. Furthermore, curing progresses before a water content in the aqueous adhesive evaporates, so that the adhesive strength is reduced due to a water content remaining in the cured adhesive.

In the aqueous adhesive disclosed in JP58-98372, morpholine disulfide is blended as a vulcanizing agent. The curing rate of the aqueous adhesive is very low, and production efficiency is poor. Furthermore, the adhesive strength thereof is also unsatisfactory.

In an adhesive that contains a rubber component and a vulcanizing agent, not only vulcanization reaction of the rubber component in the adhesive but also vulcanization reaction between the rubber component and a rubber member that is a surface to be adhered is considered to exert an influence on the obtained adhesive strength. An appropriate vulcanization reaction rate enhances adhesive strength for the rubber member.

A vulcanization acceleration aid is used for controlling the vulcanization reaction rate. For example, JP57-179265 discloses a vulcanization acceleration aid such as stearic acid, oleic acid, triethanolamine, and the like. However, according to the findings of the inventors of the present invention, if the conventional vulcanization acceleration aid is added to an aqueous adhesive, the vulcanization acceleration aid is poorly dispersed in an aqueous medium (water in many cases) containing a rubber component, and the effect of the vulcanization acceleration aid cannot be sufficiently exhibited. Furthermore, a rubber component in latex may be aggregated by adding the vulcanization acceleration aid.

A technique for appropriately controlling a vulcanization reaction rate of an aqueous adhesive and enhancing the adhesive strength has not been suggested yet. A first object of the present invention is to provide an aqueous adhesive, for rubber, which exhibits high adhesive strength and allows production of rubber products having excellent durability.

From other viewpoints, Patent Literatures 1 to 5 each suggest an aqueous adhesive for adhering melton (felt) to an outer peripheral surface of a core. According to the findings of the inventors of the present invention, the aqueous adhesive disclosed in Patent Literatures 1 to 5 does not have the adhesive strength required for a core of a hollow ball.

Furthermore, for tennis, a ball which provides softer feel at impact is required in order to satisfy preferences of a wide variety of players. In recent years, new sports which are derived from tennis and in which hollow balls are used are played worldwide. Therefore, hollow balls having a wide variety of hardnesses need to be developed.

To date, a technique in which an additive such as a filler, a vulcanizing agent, and the like are blended in order to enhance adhesive strength of an adhesive in which rubber latex is used, has been known. However, blending of the additive increases viscosity of the adhesive itself, so that fluidity is reduced. Furthermore, an adhesive layer containing the additive becomes excessively hard after curing, so that feel at impact of the ball may be hindered.

An aqueous adhesive that exhibits high adhesive strength and does not hinder feel at impact of the ball has not been suggested yet. A second object of the present invention is to provide an aqueous adhesive, for balls, exhibiting excellent adhesive strength.

Solution to the Problems

The inventors of the present invention have taken notice of contribution of ammonia in natural rubber latex to acceleration of vulcanization reaction, and have found as a result of thorough research that a vulcanization reaction rate of an aqueous adhesive is controlled to be in an appropriate range by addition of ammonium salt, to complete the present invention.

Specifically, an aqueous adhesive for rubber according to the present invention includes rubber latex and an ammonium-salt-based vulcanization acceleration aid. An amount of the ammonium-salt-based vulcanization acceleration aid in the aqueous adhesive is preferably not less than 0.01% by weight and not greater than 5.0% by weight in terms of solid content.

The ammonium-salt-based vulcanization acceleration aid is preferably a compound represented by general formula (1),

[Chemical formula 1]

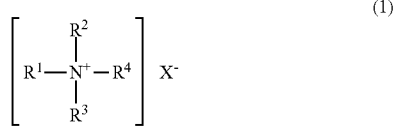

In the formula (1), $R^1$, $R^2$, $R^3$, and $R^4$ each independently represent a hydrogen atom, linear, branched or cyclic C1 to C20 alkyl group, alkyl ether group, hydroxy group, phenyl group, alkylphenyl group, nitrogen-containing heterocyclic group, sulfur-containing heterocyclic group, or nitrogen-and-sulfur-containing heterocyclic group, $X^-$ represents a chlorine ion, a bromine ion, an iodine ion, or a carboxylate ion represented by general formula $[R^5—COO]^-$, and $R^5$ represents a hydrogen atom, linear, branched or cyclic C1 to C20 alkyl group, alkyl ether group, phenyl group, alkylphenyl group, hydroxyphenyl group, nitrogen-containing heterocyclic group, sulfur-containing heterocyclic group, or nitrogen-and-sulfur-containing heterocyclic group.

The ammonium-salt-based vulcanization acceleration aid is preferably an aqueous solution of a reaction product obtained by reaction in water between hydrohalic acid and/or carboxylic acid and a compound represented by general formula (2).

[Chemical formula 2]

In the formula (2), $R^6$, $R^7$, and $R^8$ each independently represent a hydrogen atom, linear, branched or cyclic C1 to C20 alkyl group, alkyl ether group, hydroxy group, phenyl group, alkylphenyl group, nitrogen-containing heterocyclic group, sulfur-containing heterocyclic group, or nitrogen-and-sulfur-containing heterocyclic group.

Preferably, the aqueous adhesive further includes a sulfenamide-based vulcanization accelerator. An amount of the sulfenamide-based vulcanization accelerator in the aqueous adhesive is not less than 0.01% by weight and not greater than 5.0% by weight in terms of solid content.

The sulfenamide-based vulcanization accelerator is preferably a compound represented by general formula $R^9—S—N(—R^{10})—R^{11}$. $R^9$, $R^{10}$, and $R^{11}$ each independently represent a hydrogen atom, linear, branched or cyclic C3 to C20 alkyl group, alkyl ether group, alkylphenyl group, nitrogen-containing heterocyclic group, sulfur-containing heterocyclic group, or nitrogen-and-sulfur-containing heterocyclic group.

A 95% torque value $N_1$ obtained by measuring a solid content in the aqueous adhesive at a temperature of 160° C. by a curelastometer is preferably not less than 0.4 N·m and not greater than 3.0 N·m. A ratio $N_1/N_0$ of the torque value $N_1$ to a torque value $N_0$ is preferably not less than 1.03 and not greater than 2.00 when No represents a 95% torque value obtained by measuring a solid content in an aqueous adhesive containing no ammonium-salt-based vulcanization acceleration aid at a temperature of 160° C. by a curelastometer.

The rubber latex is preferably natural rubber latex and/or synthetic rubber latex.

Preferably, the aqueous adhesive further includes an inorganic filler. An amount of the inorganic filler is preferably not less than 0.1% by weight and not greater than 40% by weight in terms of solid content. The inorganic filler is preferably one or more selected from the group consisting of silica, carbon black, calcium carbonate, calcium hydroxide, magnesium hydroxide, talc, mica, diatomaceous earth, titanium oxide, zinc oxide, bismuth oxide, barium sulfate, magnesium carbonate, and alumina.

A solid content concentration of the aqueous adhesive is preferably not less than 3.0% by weight and not greater than 70% by weight. In the aqueous adhesive, a viscosity measured at 23±1° C. by using a Brookfield rotational viscometer is preferably not less than 20 cps and not greater than 20,000 cps. A pH of the aqueous adhesive is preferably not lower than 7.0 and not higher than 12.0.

A tennis ball according to the present invention includes a hollow core formed of two hemispherical half cores. The two half cores are adhered to each other by using any of the above-described aqueous adhesives.

A production method for producing an aqueous adhesive for rubber according to the present invention includes
  (1) adding a dispersant to water and preparing a dispersion medium,
  (2) putting and mixing each of a plurality of additives to be blended with rubber latex, in the dispersion medium, and thereafter adjusting a pH such that the pH is not lower than 8.0 and not higher than 12.0, to obtain a slurry of each additive, and
  (3) adding the obtained slurry of each of the additives to the rubber latex, and mixing the slurry and the rubber latex. At least one of the plurality of additives is an ammonium-salt-based vulcanization acceleration aid.

From another viewpoint, in tennis play and the like, a ball having high resilience performance is advantageous. A vulcanizing agent, a vulcanization accelerator, an inorganic filler, and the like are blended with a rubber composition of a core or a half core in order to enhance resilience performance. The vulcanizing agent and the vulcanization accelerator contribute to acceleration of vulcanization reaction of rubber components. The inorganic filler contributes to enhancement of reinforcing performance. Among the inorganic fillers, a metal oxide such as zinc oxide or the like can contribute also to acceleration of the vulcanization reaction. The inventors of the present invention have found as a result of thorough research that a vulcanization reaction accelerating component in the half core can transfer to the aqueous adhesive applied to the half core, to complete the present invention.

Specifically, an aqueous adhesive for a ball according to the present invention includes rubber latex as a main component, and a content of an inorganic filler is not greater than 0.1% by weight in terms of solid content. The rubber latex is preferably natural rubber latex and/or synthetic rubber latex.

A sulfur content of the aqueous adhesive is preferably not less than 0.5% by weight and not greater than 18.0% by weight in terms of solid content.

Preferably, the aqueous adhesive further includes a sulfenamide-based vulcanization accelerator. The sulfenamide-based vulcanization accelerator is preferably a compound represented by general formula $R^1$—S—N(—$R^2$)—$R^3$. $R^1$, $R^2$, and $R^3$ each independently represent a hydrogen atom, linear, branched or cyclic C3 to C20 alkyl group, alkyl ether group, alkylphenyl group, nitrogen-containing heterocyclic group, sulfur-containing heterocyclic group, or nitrogen-and-sulfur-containing heterocyclic group. An amount of the sulfenamide-based vulcanization accelerator is preferably not less than 0.01% by weight and not greater than 5.0% by weight in terms of solid content.

The inorganic filler is preferably one or more selected from the group consisting of silica, carbon black, calcium carbonate, calcium hydroxide, mica, magnesium hydroxide, diatomaceous earth, titanium oxide, zinc oxide, bismuth oxide, barium sulfate, talc, magnesium carbonate, and alumina.

In the aqueous adhesive, a viscosity measured at 23±1° C. by using a Brookfield rotational viscometer is preferably not less than 20 cps and not greater than 20,000 cps. A pH of the aqueous adhesive is preferably not lower than 7.0 and not higher than 12.0.

A production method for producing the aqueous adhesive includes
(1) adding a dispersant to water and preparing a dispersion medium,
(2) putting and mixing an additive to be blended with rubber latex, in the dispersion medium, and thereafter adjusting a pH such that the pH is not lower than 8.0 and not higher than 12.0, to obtain a slurry of the additive, and
(3) adding the obtained slurry of the additive to the rubber latex, and mixing the slurry and the rubber latex.

A ball according to the present invention incudes a hollow core obtained by crosslinking a rubber composition that contains a vulcanizing agent. The core is formed of two hemispherical half cores. The two half cores are adhered to each other by using any of the above-described aqueous adhesives.

Advantageous Effects of the Invention

In the aqueous adhesive for rubber according to the present invention, a speed of the vulcanization reaction of the rubber component is controlled to become appropriate by the ammonium-salt-based vulcanization acceleration aid.

The curing rate of the aqueous adhesive is appropriate. The aqueous adhesive has high adhesive strength. A rubber product having excellent durability is obtained by using the aqueous adhesive.

An amount of the inorganic filler contained in the aqueous adhesive for a ball according to the present invention is not greater than 0.1% by weight. The aqueous adhesive does not cause increase of viscosity due to the inorganic filler. The aqueous adhesive has excellent fluidity. Therefore, the aqueous adhesive can be uniformly applied to an adhesion surface in a short time period. The aqueous adhesive allows the adhesion surfaces to be sufficiently adhered to each other.

In a case where the aqueous adhesive is used for adhering half cores formed of a rubber composition, a vulcanization reaction accelerating component in the half cores transfers to the applied aqueous adhesive. The vulcanization reaction accelerating component that has transferred from the half cores accelerates vulcanization reaction of the aqueous adhesive. Thus, adhesive strength equivalent to that of a conventional adhesive containing an inorganic filler can be obtained.

DESCRIPTION OF EMBODIMENTS

Figure 1:
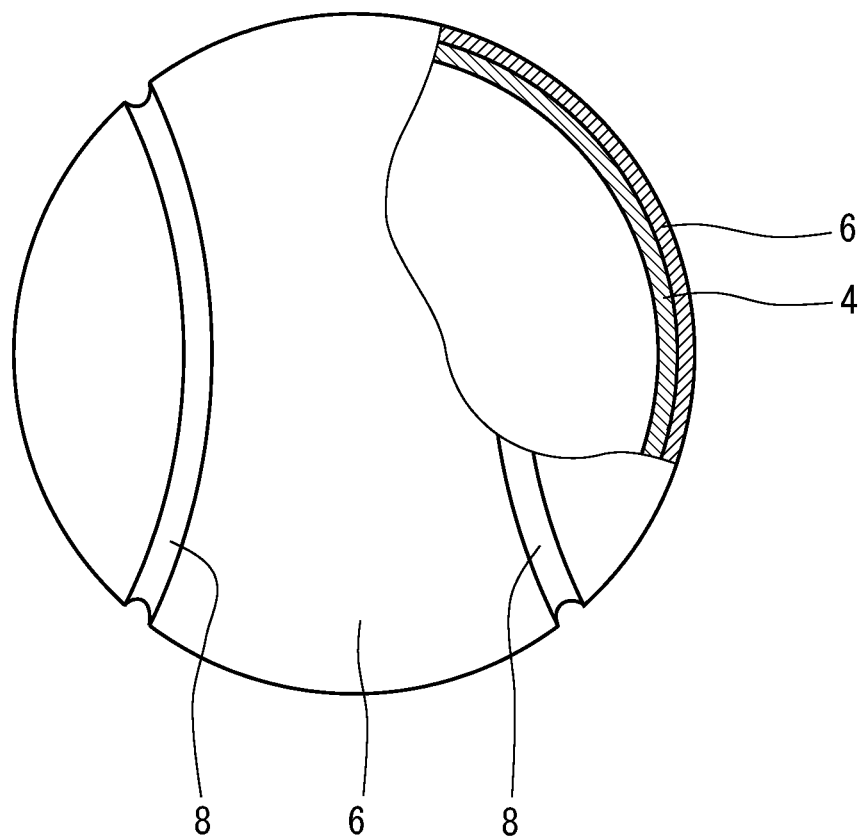
FIG. 1 is a partially cutaway cross-sectional view of a tennis ball obtained by using an adhesive according to one embodiment of the present invention.

The following will describe in detail the present invention based on preferred embodiments with appropriate reference to the drawings.

First Embodiment

An aqueous adhesive for rubber according to the present invention contains rubber latex and an ammonium-salt-based vulcanization acceleration aid (hereinafter, may be referred to as "ammonium-salt-based aid"). In a rubber member adhering process step, firstly, the adhesive is applied to an adhesion surface of a rubber member. Subsequently, the adhesion surface to which the adhesive has been applied and an adhesion surface of another rubber member are adhered to each other, and the obtained product is then heated and pressed. By the heating and pressing, a volatile component (mainly, water content) in the adhesive is eliminated, and vulcanization reaction of a rubber component derived from the rubber latex progresses. The adhesive is cured by the vulcanization reaction of the rubber component to join the rubber members to each other.

The vulcanization reaction represents a reaction in which a vulcanizing agent such as sulfur or the like cleaves to form a crosslinked structure between rubber molecules. The ammonium-salt-based vulcanization acceleration aid is decomposed by heating to generate ammonia. The ammonia contributes to cleavage of the molecular chains of sulfur. It is considered that vulcanization reaction is thus accelerated and an adhesive force becomes higher.

In general, after an aqueous adhesive is applied to an adhesion surface, the aqueous adhesive is heated and thus dried and vulcanized. If ammonia is blended as it is in the aqueous adhesive, ammonia vaporizes due to its low boiling point and is thus lost, so that the effect thereof is not sufficiently exhibited. Meanwhile, a boiling point of an ammonium-salt-based aid is higher than that of ammonia. Therefore, in the aqueous adhesive having an ammonium-salt-based aid blended therein, inactivation caused by the vaporization is avoided, and a vulcanization accelerating effect is sufficiently exhibited by ammonia generated by decomposition reaction.

Furthermore, the structure of the ammonium-salt-based vulcanization acceleration aid is a salt. Therefore, affinity for an aqueous medium (water in many cases) of rubber latex is high. The ammonium-salt-based aid which is added to the rubber latex is uniformly dispersed in the aqueous medium without aggregating the rubber component. The aqueous adhesive is uniformly applied to the adhesion surface of the rubber member. Thus, excellent adhesion and high adhesive strength can be obtained.

An amount of the ammonium-salt-based vulcanization acceleration aid contained in the aqueous adhesive for rubber is preferably not less than 0.01% by weight in terms of solid content, that is, as a ratio (percentage) to the total amount of the solid contents in the aqueous adhesive. The aqueous adhesive in which the content of the ammonium-salt-based aid is not less than 0.01% by weight accelerates vulcanization reaction between rubber components and vulcanization reaction between the rubber component and a rubber member to be adhered, thereby enhancing the adhesive strength. From the viewpoint of easily obtaining the effect of the present invention, an amount of the ammonium-salt-based vulcanization acceleration aid in the aqueous adhesive is more preferably not less than 0.05% by weight and particularly preferably not less than 0.1% by weight in terms of solid content.

An amount of the ammonium-salt-based vulcanization acceleration aid contained in the aqueous adhesive for rubber is preferably not greater than 5.0% by weight in terms of solid content, that is, as a ratio (percentage) to the total amount of the solid contents in the aqueous adhesive. In the aqueous adhesive in which the amount of the ammonium-salt-based aid is not greater than 5.0% by weight, the vulcanization reaction rate is appropriate. Before the aqueous adhesive is cured after being applied to the rubber member, the aqueous adhesive can flow into fine gaps in the adhesion surface. Thus, adhesion between the rubber members is enhanced. Furthermore, adhesive strength can be enhanced by an anchor effect. Moreover, before the aqueous adhesive is cured, a volatile component (water content) is sufficiently eliminated from the aqueous adhesive, and the aqueous adhesive is thereafter cured quickly. In a rubber product obtained by using the aqueous adhesive, reduction of the adhesive strength by a remaining volatile component (water content) does not occur. The aqueous adhesive can prevent adhesion inhibition due to an ammonium-salt-based aid excessively deposited on the adhesion interface. From this viewpoint, the amount of the ammonium-salt-based vulcanization acceleration aid in the aqueous adhesive is more preferably not greater than 3.0% by weight and particularly preferably not greater than 1.5% by weight.

A kind of the ammonium-salt-based vulcanization acceleration aid is not particularly limited as long as the effect of the present invention is obtained. However, preferable examples of the ammonium-salt-based vulcanization acceleration aid include compounds represented by the following general formula (1).

[Chemical formula 3]

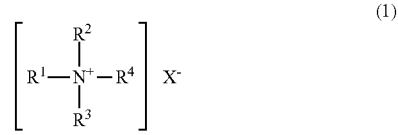

In the formula (1), $R^1$, $R^2$, $R^3$ and $R^4$ each independently represent a hydrogen atom, linear, branched or cyclic C1 to C20 alkyl group, alkyl ether group, hydroxy group, phenyl group, alkylphenyl group, nitrogen-containing heterocyclic group, sulfur-containing heterocyclic group, or nitrogen-and-sulfur-containing heterocyclic group. $X^-$ represents a chlorine ion, a bromine ion, an iodine ion, or a carboxylate ion represented by the general formula $[R^5—COO]^-$. $R^5$ represents a hydrogen atom, linear, branched or cyclic C1 to C20 alkyl group, alkyl ether group, phenyl group, alkylphenyl group, hydroxyphenyl group, nitrogen-containing heterocyclic group, sulfur-containing heterocyclic group, or nitrogen-and-sulfur-containing heterocyclic group.

Specific examples of the compound represented by the general formula (1) include ammonium acetate, dimethylammonium acetate, diethylammonium acetate, ammonium salicylate, ammonium stearate, and ammonium chloride. From the viewpoint of affinity for the rubber latex and workability, ammonium acetate and ammonium salicylate are more preferable. Two or more kinds of the ammonium-salt-based aids may be used in combination.

The aqueous adhesive for rubber may contain a vulcanization acceleration aid other than the ammonium-salt-based vulcanization acceleration aid as long as the effect of the present invention is not hindered. Examples of the vulcanization acceleration aid that can be used in combination include metal oxides such as zinc oxide and the like, fatty acids such as stearic acid and the like, fatty acid metal salts such as zinc stearate and the like, and amines.

From the viewpoint of miscibility with the rubber latex, the ammonium-salt-based vulcanization acceleration aid is preferably an aqueous solution of a reaction product obtained by reaction in water between hydrohalic acid and/or carboxylic acid and a compound represented by the following general formula (2).

[Chemical formula 4]

In the formula (2), $R^6$, $R^7$, and $R^8$ each independently represent a hydrogen atom, linear, branched or cyclic C1 to C20 alkyl group, alkyl ether group, hydroxy group, phenyl group, alkylphenyl group, nitrogen-containing heterocyclic group, sulfur-containing heterocyclic group, or nitrogen-and-sulfur-containing heterocyclic group.

The compound represented by the general formula (2) is ammonia or amines. Specific examples of the compound include ammonia, methylamine, ethylamine, dimethylamine, diethylamine, trimethylamine, triethylamine, and methylethylamine. From the viewpoint of reactivity and stability, ammonia and diethylamine are preferable. Two or more kinds of the compounds may be used in combination.

A kind of the hydrohalic acid and/or the carboxylic acid is not particularly limited, and a hydrohalic acid and/or a carboxylic acid that can react with the compound represented by the general formula (2) to generate the ammonium-salt-based vulcanization acceleration aid is selected and used as appropriate. The hydrohalic acid is an aqueous solution of hydrogen halide such as hydrogen fluoride, hydrogen chloride, hydrogen bromide, hydrogen iodide, or the like. Examples of the carboxylic acid include formic acid, acetic acid, propionic acid, octanoic acid, lauric acid, myristic acid, stearic acid, 10-undecylenic acid, myristoleic acid, palmitoleic acid, oleic acid, linoleic acid, benzoic acid, phthalic acid, salicylic acid, citric acid, malonic acid, succinic acid, glutaric acid, and adipic acid. From the viewpoint of reactivity and stability, hydrogen chloride acid (hydrochloric acid), acetic acid, and salicylic acid are preferable, and hydrochloric acid and acetic acid are more preferable. Two or more kinds thereof may be used in combination.

A kind of the rubber latex contained in the aqueous adhesive for rubber is not particularly limited as long as appropriate curing rate and adhesive strength are obtained. In the description herein, the rubber latex represents an emulsion in which a rubber component is dispersed in water or an aqueous solution in the form of particulates. Natural rubber latex and/or synthetic rubber latex are preferably used.

Examples of synthetic rubber in the synthetic rubber latex include styrene-butadiene rubber, acrylonitrile-butadiene rubber, chloroprene rubber, butadiene rubber, isoprene rubber, isobutylene-isoprene rubber, ethylene-propylene rubber, and modified products thereof. Examples of the modified products include rubber modified with a functional group such as a carboxyl group, an amine group, a hydroxy group, and the like. From the viewpoint of adhesive strength, one or more selected from the group consisting of natural rubber latex, styrene-butadiene rubber, butadiene rubber, and isoprene rubber is preferable, one or more selected so as to include at least natural rubber latex is more preferable, and natural rubber latex is particularly preferable. From the viewpoint of fluidity and adhesion, natural rubber latex is more preferably depolymerized natural rubber latex.

A solid content concentration of the rubber latex is preferably not greater than 80% by weight and more preferably not greater than 70% by weight, from the viewpoint of mixability with slurries of various additives described below. The solid content concentration of the rubber latex is preferably not less than 20% by weight and more preferably not less than 30% by weight, from the viewpoint of adhesive strength. The solid content concentration of the rubber latex is obtained in compliance with the method described in JIS K6387-2 "Latex, rubber-Determination of total solids content".

The aqueous adhesive for rubber according to the present invention may further contain a sulfenamide-based vulcanization accelerator. The sulfenamide-based vulcanization accelerator initially acts as a reaction retarder in rubber vulcanization reaction, and acts as a reaction accelerator after elapse of a predetermined time period. The sulfenamide-based vulcanization accelerator can contribute to maintaining of fluidity in an initial stage of adhesion between the rubber members and contribute to a high degree of curing after a predetermined time period.

Preferable examples of the sulfenamide-based vulcanization accelerator include compounds represented by general formula $R^9$—S—N(—$R^{10}$)—$R^{11}$. In this general formula, $R^9$, $R^{10}$, and $R^{11}$ each independently represent a hydrogen atom, linear, branched or cyclic C3 to C20 alkyl group, alkyl ether group, alkylphenyl group, nitrogen-containing heterocyclic group, sulfur-containing heterocyclic group, or nitrogen-and-sulfur-containing heterocyclic group.

Specific examples of such a compound include N-cyclohexyl-2-benzothiazole sulfenamide, N-tert-butyl-2-benzothiazole sulfenamide, N,N'-dicyclohexyl-2-benzothiazolyl sulfenamide, N-oxydiethylene-2-benzothiazole sulfenamide, N,N-diisopropyl-2-benzothiazole sulfenamide, and N-ethyl-2-benzothiazole sulfenamide. The compound is more preferably one or more selected from the group consisting of N-cyclohexyl-2-benzothiazole sulfenamide, N-tert-butyl-2-benzothiazole sulfenamide, and N-oxydiethylene-2-benzothiazole sulfenamide.

From the viewpoint of adhesive strength, an amount of the sulfenamide-based vulcanization accelerator contained in the aqueous adhesive for rubber is preferably not less than 0.01% by weight, more preferably not less than 0.05% by weight, and particularly preferably not less than 0.1% by weight in terms of solid content. From the viewpoint of adhesion, the amount of the sulfenamide-based vulcanization accelerator contained in the aqueous adhesive is preferably not greater than 5.0% by weight, more preferably not greater than 2.0% by weight, and particularly preferably not greater than 1.0% by weight in terms of solid content.

The aqueous adhesive for rubber may contain a vulcanization accelerator other than the sulfenamide-based vulcanization accelerator as long as the effect of the present invention is not hindered. Examples of the vulcanization accelerator that can be used in combination include guanidine-based vulcanization accelerators, thiazole-based vulcanization accelerators, thiuram-based vulcanization accelerators, thiourea-based vulcanization accelerators, dithiocarbamate-based vulcanization accelerators, morpholine-based vulcanization accelerators, aldehyde-amine-based vulcanization accelerators, aldehyde-ammonia-based vulcanization accelerators, imidazoline-based vulcanization accelerators, and xanthate-based vulcanization accelerators.

In a case where the sulfenamide-based vulcanization accelerator and the other vulcanization accelerator are used in combination, a proportion of the sulfenamide-based vulcanization accelerator to the total of the vulcanization accelerators is preferably not less than 80% by weight, more preferably not less than 90% by weight, and particularly preferably not less than 95% by weight.

The aqueous adhesive for rubber may contain a vulcanizing agent as necessary. Preferable examples of the vulcanizing agent include: sulfur such as powdery sulfur, insoluble sulfur, precipitated sulfur, colloidal sulfur, and the like; and sulfur compounds such as morpholine disulfide, alkylphenol disulfide, and the like. An amount of the vulcanizing agent in the aqueous adhesive is not particularly limited. However, from the viewpoint of adhesive strength, the amount of the vulcanizing agent is preferably not less than 0.5% by weight and more preferably not less than 0.8% by weight in terms of solid content. From the viewpoint of an appropriate curing rate, the amount of the vulcanizing agent is preferably not greater than 10% by weight in terms of solid content.

The aqueous adhesive for rubber may contain an inorganic filler as long as the effect of the present invention is obtained. The inorganic filler is preferably one or more selected from the group consisting of silica, carbon black, calcium carbonate, calcium hydroxide, magnesium hydroxide, talc, mica, diatomaceous earth, titanium oxide, zinc oxide, bismuth oxide, barium sulfate, magnesium carbonate, and alumina. An amount of the inorganic filler in the aqueous adhesive is not particularly limited. However, from the viewpoint of adhesiveness to the adhesion surface, the amount of the inorganic filler is preferably not less than 0.1% by weight, more preferably not less than 1.0% by weight, and particularly preferably not less than 10% by weight in terms of solid content. From the viewpoint of fluidity, the amount of the inorganic filler is preferably not greater than 40% by weight, more preferably not greater than 35% by weight, and particularly preferably not greater than 30% by weight in terms of solid content.

The aqueous adhesive for rubber may further contain various additives such as a thickener, a tackifier, an anti-aging agent, an antioxidant, a light stabilizer, a softener, a processing aid, a coloring agent, or the like as long as the effect of the present invention is not hindered.

The concentration of the total solid content in the aqueous adhesive for rubber is not particularly limited as long as the effect of the present invention is obtained. From the viewpoint of adhesive strength, the solid content concentration is preferably not less than 3.0% by weight, more preferably not less than 5.0% by weight, even more preferably not less than 10% by weight, and particularly preferably not less than 15% by weight. From the viewpoint of fluidity, the solid content concentration is preferably not greater than 70% by weight, more preferably not greater than 60% by weight, and particularly preferably not greater than 50% by weight.

A 95% torque value $N_1$, at the temperature of 160° C., of the solid content in the aqueous adhesive is preferably measured by a curelastometer in compliance with the method described in JIS K6300-2 "Rubber, unvulcanized-Physical property-Part 2: Determination of cure characteristics with oscillating curemeters". The measurement method will be described below in detail in Examples.

The 95% torque value $N_1$ obtained for the aqueous adhesive, for rubber, containing the ammonium-salt-based vulcanization acceleration aid is preferably not less than 0.4 N·m and not greater than 3.0 N·m. In the aqueous adhesive in which the 95% torque value $N_1$ is not less than 0.4 N·m, high adhesive strength can be obtained. The rubber product produced by using the aqueous adhesive has excellent durability. From this viewpoint, the 95% torque value $N_1$ is more preferably not less than 0.6 N·m and particularly preferably not less than 1.0 N·m. The aqueous adhesive in which the 95% torque value $N_1$ is not greater than 3.0 N·m has excellent fluidity. Thus, adhesion between the rubber members is enhanced, and high adhesive strength can be achieved by the anchor effect.

A 95% torque value $N_0$, at the temperature of 160° C., of a solid content in an aqueous adhesive, for rubber, containing no ammonium-salt-based vulcanization acceleration aid is preferably measured by a curelastometer. The 95% torque value $N_0$ of the aqueous adhesive containing no ammonium-salt-based aid is less than the 95% torque value $N_1$ obtained for the aqueous adhesive that has the same composition as the aqueous adhesive containing no ammonium-salt-based aid except for presence or absence of the ammonium-salt-based aid. This means that adhesive strength of the aqueous adhesive has been enhanced by blending the ammonium-salt-based aid. From this viewpoint, a ratio $N_1/N_0$ of the torque value $N_1$ to the torque value $N_0$ is preferably not less than 1.03, more preferably not less than 1.07, and particularly preferably not less than 1.10. From the viewpoint of fluidity, the ratio $N_1/N_0$ is preferably not greater than 2.00, more preferably not greater than 1.70, and particularly preferably not greater than 1.50.

From the viewpoint of adhesiveness to the adhesion surface, a viscosity of the aqueous adhesive for rubber is preferably not less than 20 cps, more preferably not less than 100 cps, and particularly preferably not less than 200 cps. From the viewpoint of coatability and fluidity, the viscosity of the aqueous adhesive is preferably not greater than 20,000 cps, more preferably not greater than 10,000 cps, and particularly preferably not greater than 6,000 cps. The viscosity of the aqueous adhesive is measured at a measurement temperature of 23±1° C. by using a Brookfield rotational viscometer. The measurement method will be described below in detail in Examples.

From the viewpoint of stability of the latex, a pH of the aqueous adhesive for rubber is adjusted to be preferably not lower than 7.0 and not higher than 12.0, more preferably not lower than 8.0 and not higher than 11.5, and particularly preferably not lower than 9.5 and not higher than 10.5. The pH measurement method will be described below in Examples.

A method for producing the aqueous adhesive for rubber according to the present invention includes
(1) adding a dispersant to water and preparing a dispersion medium,
(2) putting and mixing each of a plurality of additives to be blended with rubber latex, in the dispersion medium, and thereafter adjusting a pH such that the pH is not lower than 8.0 and not higher than 12.0, to obtain a slurry of each additive, and
(3) adding the obtained slurry of each additive to the rubber latex and mixing the slurry and the rubber latex.

In the present invention, at least one of the plurality of additives to be blended with the rubber latex is the ammonium-salt-based vulcanization acceleration aid. In other words, the production method includes adding a slurry of the ammonium-salt-based vulcanization acceleration aid to the rubber latex and mixing the slurry and the rubber latex. The production method may include blending, with the rubber latex, a slurry of a vulcanization acceleration aid other than the ammonium-salt-based aid as long as the effect of the present invention is not hindered. Examples of the other additive which is blended with the rubber latex include a vulcanizing agent, a vulcanization accelerator, an inorganic filler, a thickener, an anti-aging agent, an antioxidant, a light stabilizer, a softener, a processing aid, a coloring agent, and the like.

The dispersion medium is used for preparing a slurry in which each of the plurality of additives is dispersed. A kind of the dispersant is not particularly limited. The dispersant to be used is selected from anionic, nonionic, and cationic surfactants as appropriate according to a kind of the additive and the concentration of the slurry. Examples of the anionic surfactant include C8 to C20 alkylsulfonate, alkylaryl sulfate, sodium naphthalenesulfonate-formaldehyde condensates, and alkali metal salts of rosin acids. Examples of the nonionic surfactant include aromatic polyglycol ether, polyvinyl alcohol, polyoxyethylene alkyl ether, and polyoxyethylene monostearate. Examples of the cationic surfactant include dilauryldimethylammonium chloride, hexadecyltrimethylammonium chloride, octadecyltrimethylammonium chloride, and dodecyltrimethylammonium chloride. The anionic or nonionic surfactant is preferable. Two or more kinds of the surfactants may be used in combination.

From the viewpoint of stability of the slurry, the concentration of the dispersant in the dispersion medium is preferably not less than 0.5% by weight and more preferably not less than 1.0% by weight. From the viewpoint of adhesive strength of the obtained adhesive, the concentration of the dispersant in the dispersion medium is preferably not greater than 20% by weight and more preferably not greater than 15% by weight.

From the viewpoint of latex dispersion stability, preferably, the production method further includes adjusting a pH of the dispersion medium such that the pH is not lower than 8.0 and not higher than 12.0. For example, the dispersion medium may be prepared by adding ammonia water or the like until a predetermined pH is obtained after the dispersant is dissolved in purified water.

In the production method, each of the plurality of additives is put into the dispersion medium so as to obtain a predetermined solid content concentration. The pH is adjusted to be not lower than 8.0 and not higher than 12.0, and, thereafter, each additive is uniformly mixed by a ball mill or the like, to obtain the slurry of the additive. Thereafter, the obtained slurry of each additive is added to the rubber latex and uniformly mixed, to produce the aqueous adhesive according to the present invention. The production method may further include adding a diluent such as water or the like and adjusting the solid content concentration after the slurry of each additive is blended with the rubber latex.

The aqueous adhesive for rubber according to the present invention can be preferably used for producing, for example, tennis balls. FIG. 1 shows a tennis ball 2 obtained by using the aqueous adhesive according to one embodiment of the present invention. The tennis ball 2 includes a hollow core 4, two felt portions 6 covering the core 4, and seam portions 8 positioned in gaps between the two felt portions 6. The thickness of the core 4 is about 3 mm to 4 mm in general. The interior of the core 4 is filled with compressed gas. The two felt portions 6 are adhered to the surface of the core 4 by an adhesive.

Figure 2A:
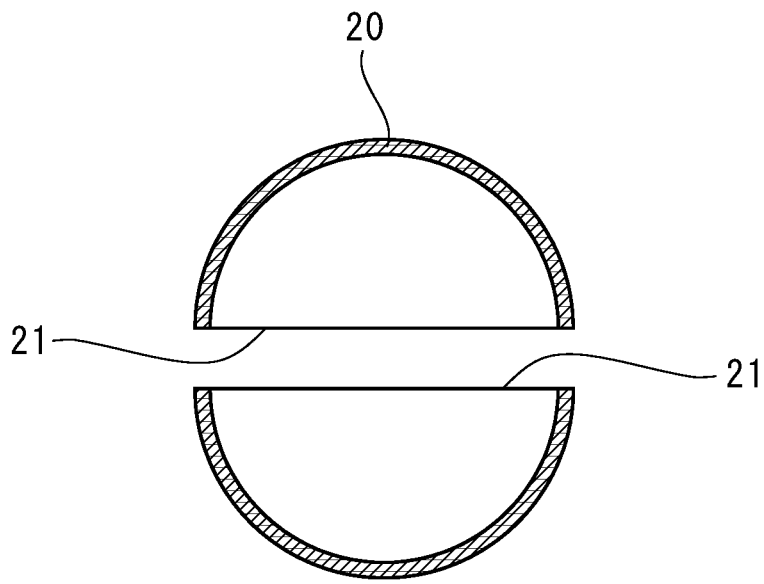
FIGS. 2A and 2B are cross-sectional views illustrating forming of a core of the tennis ball shown in FIG. 1.
Figure 2B:
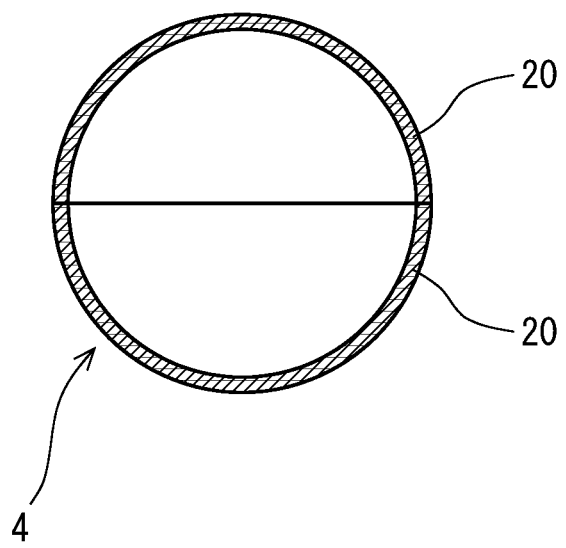

FIG. 2 is a cross-sectional view illustrating forming of the core 4 of the tennis ball 2 shown in FIG. 1. As shown in FIG. 2A, two half cores 20 are firstly prepared in the forming of the core 4. Each of the half cores 20 is hemispherical-shell-shaped, and has an annular edge portion 21. Next, the aqueous adhesive for rubber according to the present invention is applied to the edge portion 21 of each half core 20, and water and tablets of sodium chloride and sodium nitrite are put into one of the half cores 20. Thereafter, as shown in FIG. 2B, the two half cores 20 are adhered to each other at the respective edge portions 21. The spherical body formed by the two half cores 20 is put into a predetermined mold, and heated and pressed, thereby forming the hollow core 4.

Preferable materials of the core 4 (half cores 20) of the tennis ball 2 in the present embodiment will be sequentially described below. The material of the core 4 (half cores 20) can be changed as long as the object of the present invention is achieved.

The core 4 is formed by crosslinking a rubber composition. Preferable examples of the base rubber include natural rubber, polybutadiene, polyisoprene, styrene-butadiene copolymers, acrylonitrile-butadiene copolymers, polychloroprene, ethylene-propylene copolymers, ethylene-propylene-diene copolymers, isobutylene-isoprene copolymers, and acrylic rubber. The base rubber is more preferably natural rubber and polybutadiene. Two or more kinds of the base rubbers may be used in combination.

In a case where natural rubber and polybutadiene are used in combination, a weight ratio B/N of a blended amount B of polybutadiene rubber to a blended amount N of natural rubber is preferably not greater than 1.4, more preferably not greater than 1.0, and particularly preferably not greater than 0.4, from the viewpoint of feel at impact. The total amount of the base rubber may be the amount of natural rubber.

The rubber composition of the core 4 may contain a vulcanizing agent and a vulcanization accelerator. The vulcanizing agent and the vulcanization accelerator described above for the aqueous adhesive for rubber can be selected and used as appropriate. Amounts of the vulcanizing agent and the vulcanization accelerator in the rubber composition of the core 4 are adjusted according to the kinds. From the viewpoint of resilience performance, the amount thereof is preferably not less than 0.5 parts by weight and more preferably not less than 1.0 part by weight with respect to 100 parts by weight of the base rubber. The blended amount of the vulcanizing agent is preferably not greater than 5.0 parts by weight. From the viewpoint of resilience performance, the blended amount of the vulcanization accelerator is preferably not less than 1.0 part by weight and more preferably not less than 2.0 parts by weight with respect to 100 parts by weight of the base rubber. The blended amount of the vulcanization accelerator is preferably not greater than 6.0 parts by weight.

The rubber composition of the core 4 may further contain a filler. Preferable examples of the filler include talc, kaolin clay, graphite, graphene, bentonite, halloysite, montmorillonite, mica, beidellite, saponite, hectorite, nontronite, vermiculite, illite, allophane, carbon fibers, carbon nanotubes, carbon black, silica, calcium carbonate, magnesium carbonate, barium sulfate, and the like. Talc, kaolin clay, graphite, and graphene are preferable. Two or more kinds of the fillers may be used in combination.

An amount of the filler in the rubber composition of the core 4 is adjusted as appropriate according to the kind. From the viewpoint of resilience performance and durability, the amount of the filler is preferably not less than 5 parts by weight, more preferably not less than 10 parts by weight, and particularly preferably not less than 15 parts by weight with respect to 100 parts by weight of the base rubber. From the viewpoint of feel at impact, the amount of the filler is preferably not greater than 120 parts by weight, more preferably not greater than 100 parts by weight, and particularly preferably not greater than 80 parts by weight.

The rubber composition of the core 4 may further contain an additive such as a vulcanization aid, an anti-aging agent, an antioxidant, a light stabilizer, a softener, a processing aid, a coloring agent, or the like as long as the effect of the present invention is not hindered.

A method for producing the rubber composition is not particularly limited as long as the object of the present invention is achieved. For example, the rubber composition may be produced by heating and pressing a kneaded product obtained by putting and kneading the base rubber and the additives having been selected as appropriate, in a known kneading machine such as a Banbury mixer, a kneader, a roll, or the like. The kneading condition and the vulcanization condition are selected according to blending of the rubber composition. The kneading temperature is preferably not lower than 50° C. and not higher than 180° C. The vulcanization temperature is preferably not lower than 140° C. and not higher than 180° C. The vulcanization time is preferably not shorter than two minutes and not longer than 60 minutes.

A method for producing the tennis ball 2 including the core 4 obtained by using the rubber composition is not particularly limited. For example, the felt portions 6 each of which has been previously cut into a dumbbell-like shape, has an adhesive applied to the back surface, and has seam glue adhered to the cross-section, are adhered to the surface of the core 4, thereby obtaining the tennis ball 2. Before the felt portions 6 are adhered, an adhesive may be applied to the surface of the core 4. A known adhesive may be selected and used as appropriate for the adhesion of the felt portions 6 and for the seam glue.

Second Embodiment

Figure 3:
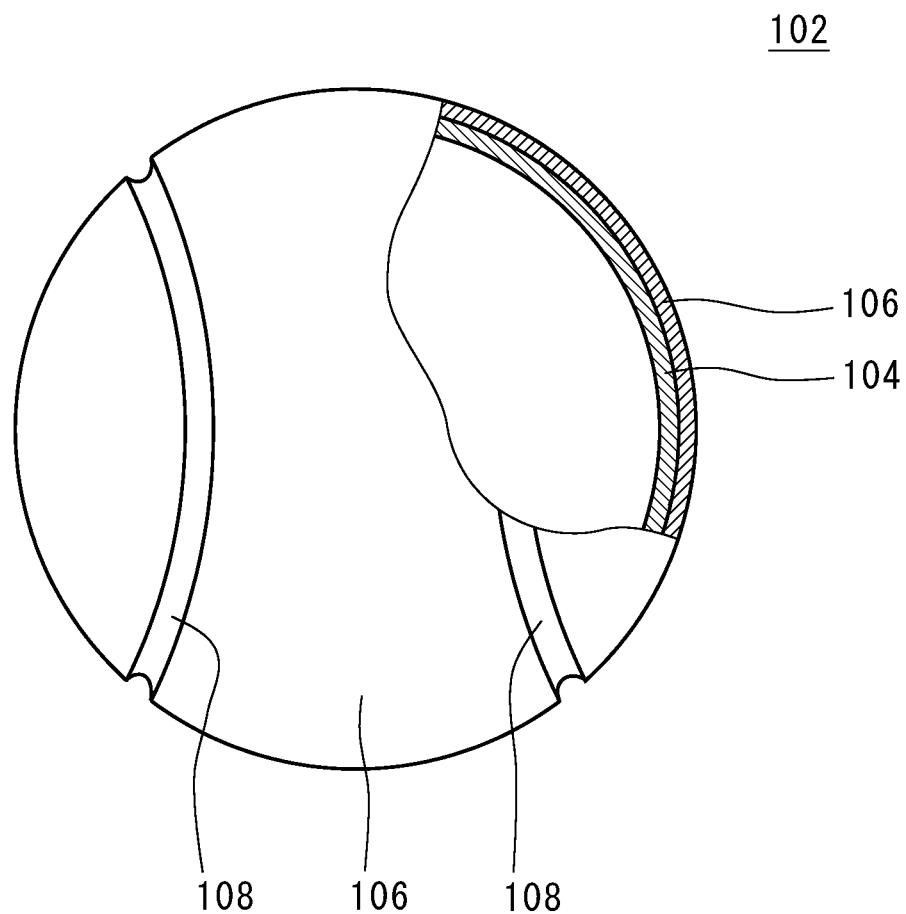
FIG. 3 is a partially cutaway cross-sectional view of a ball according to one embodiment of the present invention.

FIG. 3 shows a ball 102 according to one embodiment of the present invention. The ball 102 is a tennis ball 102. As shown in FIG. 3, the tennis ball 102 includes a hollow core 104, two felt portions 106 covering the core 104, and seam portions 108 positioned in gaps between the two felt portions 106. The thickness of the core 104 is about 3 mm to 4 mm in general. The interior of the core 104 is filled with compressed gas. The two felt portions 106 are adhered to the surface of the core 104 by an adhesive.

Figure 4A:
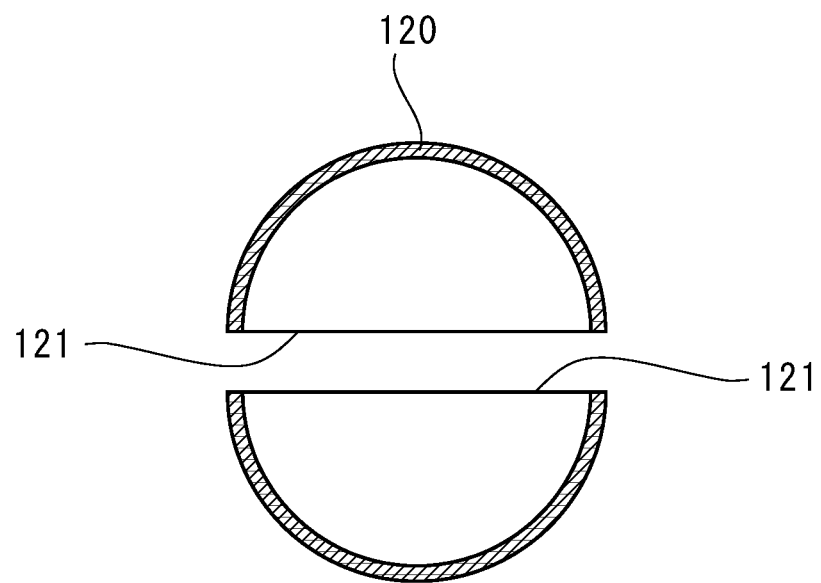
FIGS. 4A and 4B are cross-sectional views illustrating forming of a core of the ball shown in FIG. 3.
Figure 4B:
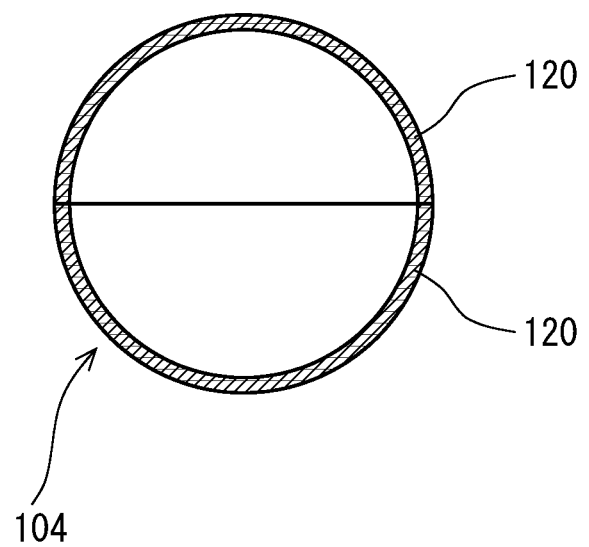

FIG. 4 is a cross-sectional view illustrating forming of the core 104 of the tennis ball 102 shown in FIG. 3. As shown in FIG. 4A, an unvulcanized rubber composition is firstly heated and pressed to prepare two half cores 120 in forming of the core 104. Each of the half cores 120 is hemispherical-shell-shaped, and has an annular edge portion 121. Next, the aqueous adhesive according to the present invention is applied to the edge portion 121 of each half core 120, and water and tablets of sodium chloride and sodium nitrite are put into one of the half cores 120. Thereafter, as shown in FIG. 4B, the two half cores 120 are adhered to each other at the respective edge portions 121. The spherical body formed by the two half cores 120 is put into a predetermined mold, and heated and pressed, thereby forming the hollow core 104.

A main component of the aqueous adhesive for a ball according to the present invention is rubber latex. When the adhesive applied to the edge portions 121 is heated and pressed in forming of the core 104, a volatile component (mainly, water content) in the adhesive is eliminated, and vulcanization reaction of a rubber component derived from the rubber latex progresses. The adhesive is cured by the vulcanization reaction of the rubber component, and the two half cores 120 are joined to each other, thereby forming the hollow core 104.

A content of an inorganic filler contained in the aqueous adhesive for a ball according to the present invention is not greater than 0.1% by weight in terms of solid content. The viscosity of the aqueous adhesive is low. The aqueous adhesive can be uniformly applied to the edge portions 121 in a short time period. Furthermore, before the aqueous adhesive is cured after the half cores 120 are adhered to each other, the aqueous adhesive can flow into fine gaps in each edge portion 121. Thus, adhesion between the half cores 120 is enhanced.

The rubber composition of the half cores 120 has, in addition to a base rubber, a vulcanizing agent, a vulcanization accelerator, an inorganic filler, and the like blended therein. In general, semi-vulcanization condition is adopted for forming the half cores 120. Therefore, the half cores 120 having been formed may contain an unreacted vulcanizing agent or the like. Furthermore, a metal oxide such as zinc oxide or the like as the inorganic filler also acts as a vulcanizing agent. According to the findings of the inventors of the present invention, a vulcanization reaction accelerating component such as the unreacted vulcanizing agent or the like contained in the half cores 120 acts on or transfers to the aqueous adhesive applied to the edge portions 121 in forming the core 104. Thus, the vulcanization reaction of the aqueous adhesive is accelerated, and adhesive strength after curing is enhanced. The aqueous adhesive according to the present invention does not contain an inorganic filler, or an amount of the inorganic filler is not greater than 0.1% by weight in terms of solid content. Regardless of such a small amount, adhesive strength equivalent to that of a conventional adhesive that contains a predetermined amount of filler is achieved. Moreover, the aqueous adhesive of the present invention has an appropriate hardness after being cured. The aqueous adhesive does not hinder feel at impact obtained from the ball 102. The aqueous adhesive is suitable for producing the ball 102 that provides soft feel at impact.

From the viewpoint of fluidity and hardness after curing, an amount of the inorganic filler contained in the aqueous adhesive for a ball is preferably less than 0.1% by weight. The less the amount of the inorganic filler is, the better the effect is. The lower limit of the amount thereof is not particularly limited. The aqueous adhesive containing no inorganic filler is particularly preferable.

In a case where the aqueous adhesive contains the inorganic filler, the kind of the inorganic filler is not particularly limited. The inorganic filler is preferably one or more selected from the group consisting of silica, carbon black, calcium carbonate, calcium hydroxide, mica, magnesium hydroxide, diatomaceous earth, titanium oxide, zinc oxide, bismuth oxide, barium sulfate, talc, magnesium carbonate, and alumina. Metal oxides such as titanium oxide, zinc oxide, bismuth oxide, and the like are more preferable, and zinc oxide is particularly preferable.

A kind of the rubber latex contained in the aqueous adhesive is not particularly limited as long as the effect of the present invention is obtained. In the description herein, the rubber latex represents an emulsion in which a rubber component is dispersed in water or an aqueous solution in the form of particulates. Natural rubber latex and/or synthetic rubber latex are preferably used.

Examples of synthetic rubber in the synthetic rubber latex include various rubbers described above for the first embodiment. From the viewpoint of adhesive strength, one or more selected from the group consisting of natural rubber latex, styrene-butadiene rubber, butadiene rubber, and isoprene rubber is preferable, one or more selected so as to include at least natural rubber latex is more preferable, and natural rubber latex is particularly preferable. From the viewpoint of fluidity and adhesion, the natural rubber latex is more preferably depolymerized natural rubber latex.

The solid content concentration of the rubber latex is preferably not greater than 80% by weight and more preferably not greater than 70% by weight, from the viewpoint of mixability with a slurry of each of various additives described below. The solid content concentration of the rubber latex is preferably not less than 20% by weight and more preferably not less than 30% by weight, from the viewpoint of adhesive strength. The solid content concentration of the rubber latex is obtained in compliance with the method described in JIS K6387-2 "Latex, rubber-Determination of total solids content".

The aqueous adhesive for a ball preferably contains a vulcanization accelerator. Preferable examples of the vulcanization accelerator include the sulfenamide-based vulcanization accelerators described above for the first embodiment. The sulfenamide-based vulcanization accelerator initially acts as a reaction retarder in rubber vulcanization reaction, and acts as a reaction accelerator after elapse of a predetermined time period. The sulfenamide-based vulcanization accelerator can contribute to maintaining of fluidity in an initial stage of adhesion between the half cores 120, and contribute to a high curing rate after a predetermined time period. One or more selected from the group consisting of N-cyclohexyl-2-benzothiazole sulfenamide, N-tert-butyl-2- benzothiazole sulfenamide, and N-oxydiethylene-2-benzothiazole sulfenamide is more preferable.

An amount of the sulfenamide-based vulcanization accelerator contained in the aqueous adhesive for a ball is preferably not less than 0.01% by weight, more preferably not less than 0.05% by weight, and particularly preferably not less than 0.1% by weight in terms of solid content. The amount of the sulfenamide-based vulcanization accelerator is preferably not greater than 5.0% by weight, more preferably not greater than 2.0% by weight, and particularly preferably not greater than 1.0% by weight in terms of solid content.

The aqueous adhesive may contain another vulcanization accelerator described above for the first embodiment instead of or in addition to the sulfenamide-based vulcanization accelerator as long as the effect of the present invention is not hindered. The sulfenamide-based vulcanization accelerator and the other vulcanization accelerator are preferably used in combination because the effect of the present invention is significantly exhibited.

In a case where the sulfenamide-based vulcanization accelerator and the other vulcanization accelerator are used in combination, a ratio of an amount of the sulfenamide-based vulcanization accelerator to the total amount of the vulcanization accelerators is preferably not less than 80% by weight, more preferably not less than 90% by weight, and particularly preferably not less than 95% by weight.

The aqueous adhesive for a ball may contain the vulcanizing agent described above for the first embodiment as necessary. An amount of the vulcanizing agent in the aqueous adhesive is not particularly limited, but is preferably not less than 0.1% by weight, more preferably not less than 0.5% by weight, and particularly preferably not less than 1.0% by weight in terms of solid content. The amount of the vulcanizing agent is preferably not greater than 40.0% by weight, more preferably not greater than 30.0% by weight, and particularly preferably not greater than 20.0% by weight in terms of solid content.

The aqueous adhesive for a ball may further contain various additives such as a vulcanization acceleration aid, an anti-aging agent, an antioxidant, a light stabilizer, a softener, a processing aid, a coloring agent, or the like as long as the effect of the present invention is not hindered.

The concentration (solid content concentration) of the total solid content contained in the aqueous adhesive for a ball is not particularly limited. From the viewpoint of adhesive strength, the solid content concentration is preferably not less than 3.0% by weight, more preferably not less than 5.0% by weight, even more preferably not less than 10% by weight, and particularly preferably not less than 15% by weight. From the viewpoint of fluidity, the solid content concentration is preferably not greater than 70% by weight, more preferably not greater than 60% by weight, and particularly preferably not greater than 50% by weight.

The aqueous adhesive for a ball preferably contains sulfur. The sulfur may be sulfur as a single element or sulfur atoms forming a sulfur compound. The sulfur may be derived from the vulcanizing agent or the vulcanization accelerator. The sulfur contained in the aqueous adhesive can contribute to forming of a crosslinked structure. From the viewpoint of enhancing adhesive strength, a content of the sulfur in the aqueous adhesive is preferably not less than 0.5% by weight, more preferably not less than 1.5% by weight, and particularly preferably not less than 2.0% by weight in terms of solid content. The content of the sulfur is preferably not greater than 18.0% by weight, more preferably 10.0% by weight or less, and particularly preferably 7.0% by weight or less. In the description herein, the content of the sulfur in the aqueous adhesive is an amount of the sulfur element measured in accordance with the oxygen flask combustion method described in GENERAL TESTS, PROCESSES AND APPARATUS in the Japanese Pharmacopoeia 17th Edition.

From the viewpoint of adhesiveness to the adhesion surface, a viscosity of the aqueous adhesive for a ball is preferably not less than 20 cps, more preferably not less than 50 cps, and particularly preferably not less than 100 cps. From the viewpoint of coatability and fluidity, the viscosity of the aqueous adhesive is preferably not greater than 20,000 cps, more preferably not greater than 10,000 cps, even more preferably not greater than 6,000 cps, and particularly preferably not greater than 2,000 cps. The viscosity of the aqueous adhesive is measured at a measurement temperature of 23±1° C. by using a Brookfield rotational viscometer. The measurement method will be described below in detail in Examples.

From the viewpoint of stability of the latex, a pH of the aqueous adhesive for a ball is adjusted to be preferably not lower than 7.0 and not higher than 12.0, more preferably not lower than 7.5 and not higher than 11.5, and particularly preferably not lower than 8.0 and not higher than 10.5. The pH measurement method will be described below in Examples.

A method for producing the aqueous adhesive for a ball according to the present invention includes
  (1) adding a dispersant to water and preparing a dispersion medium,
  (2) putting and mixing an additive to be blended with rubber latex, in the dispersion medium, and thereafter adjusting a pH such that the pH is not lower than 8.0 and not higher than 12.0, to obtain a slurry of the additive, and
  (3) adding the obtained slurry of the additive to the rubber latex and mixing the slurry and the rubber latex.

The additive which is blended with the rubber latex is not particularly limited, and a vulcanizing agent, a vulcanization accelerator, an inorganic filler, an anti-aging agent, an antioxidant, a light stabilizer, a softener, a processing aid, a coloring agent, or the like is selected and used as appropriate. Two or more kinds of the additives may be used in combination. As described above, the aqueous adhesive for a ball according to the present invention may not have an inorganic filler blended as the additive. In a case where the inorganic filler is blended, an amount of the inorganic filler is adjusted to be not greater than 0.1% by weight in terms of solid content.

The dispersion medium is used for preparing a slurry of the additive. The dispersant described above for the first embodiment is used in order to enhance dispersion stability of the additive in the slurry. A kind of the dispersant is not particularly limited, and the dispersant is selected from anionic, nonionic, and cationic surfactants as appropriate according to the kind of the additive and the concentration of the slurry. The anionic or nonionic surfactant is preferable. Two or more kinds of the surfactants may be used in combination.

From the viewpoint of stability of the slurry, a concentration of the dispersant in the dispersion medium is preferably not less than 0.5% by weight and more preferably not less than 1.0% by weight. From the viewpoint of adhesive strength of the obtained adhesive, the concentration of the dispersant in the dispersion medium is preferably not greater than 20% by weight and more preferably not greater than 15% by weight.

From the viewpoint of dispersion stability of the latex, preferably, the production method further includes previously adjusting a pH of the dispersion medium such that the pH is not lower than 8.0 and not higher than 12.0 before the additive is added. For example, the dispersion medium may be prepared by adding ammonia water or the like until a predetermined pH is obtained after the dispersant is dissolved in purified water.

In the production method, the additive is put into the dispersion medium so as to obtain a predetermined solid content concentration, and the pH is adjusted to be not lower than 8.0 and not higher than 12.0, and, thereafter, the additive is uniformly mixed by a ball mill or the like, to obtain the slurry of the additive. The obtained slurry of the additive is added to the rubber latex and uniformly mixed, to produce the aqueous adhesive for a ball according to the present invention.

In the production method, in a case where two or more kinds of additives are blended, a slurry of each additive may be prepared and each slurry may be thereafter added to a predetermined amount of rubber latex, or a slurry containing the two or more kinds of additives at predetermined compositions may be prepared and the slurry may be thereafter added to the rubber latex. The production method may further include adding a diluent such as water or the like and adjusting the solid content concentration after the slurry of each additive is blended with the rubber latex.

A preferable rubber composition of the core 104 (half cores 120) of the tennis ball 102 according to the present embodiment will be sequentially described below in detail. The rubber composition of the core 104 (half cores 120) can be changed as long as the object of the present invention is achieved.

Examples of the base rubber of the rubber composition in the core 104 include rubbers described above for the first embodiment. The base rubber is more preferably natural rubber and polybutadiene. Two or more kinds of the base rubbers may be used in combination.

The rubber composition of the core 104 contains a vulcanizing agent and a vulcanization accelerator. The vulcanizing agent and the vulcanization accelerator described above for the aqueous adhesive for a ball can be selected and used as appropriate. Two or more kinds of the vulcanizing agents or the vulcanization accelerators may be used in combination.

Amounts of the vulcanizing agent and the vulcanization accelerator in the rubber composition of the core 104 are adjusted as appropriate according to the kinds. From the viewpoint of resilience performance, an amount of the vulcanizing agent is preferably not less than 0.5 parts by weight and more preferably not less than 1.0 parts by weight with respect to 100 parts by weight of the base rubber. The amount of the vulcanizing agent is preferably not greater than 5.0 parts by weight. From the viewpoint of resilience performance, an amount of the vulcanization accelerator is preferably not less than 1.0 parts by weight and more preferably not less than 2.0 parts by weight with respect to 100 parts by weight of the base rubber. The amount of the vulcanization accelerator is preferably not greater than 6.0 parts by weight.

The rubber composition of the core 104 may further contain a filler. Preferable examples of the filler include metal oxides such as zinc oxide, titanium oxide, and the like, talc, kaolin clay, graphite, graphene, bentonite, halloysite, montmorillonite, mica, beidellite, saponite, hectorite, nontronite, vermiculite, illite, allophane, carbon fibers, carbon nanotubes, carbon black, silica, calcium carbonate, magnesium carbonate, barium sulfate, and the like. Two or more kinds of the fillers may be used in combination.

An amount of the filler in the rubber composition of the core 104 is adjusted as appropriate according to the kind. From the viewpoint of resilience performance and durability, an amount of the filler is preferably not less than 5 parts by weight, more preferably not less than 10 parts by weight, and particularly preferably not less than 15 parts by weight with respect to 100 parts by weight of the base rubber. From the viewpoint of feel at impact, the amount of the filler is preferably not greater than 120 parts by weight, more preferably not greater than 100 parts by weight, and particularly preferably not greater than 80 parts by weight.

The rubber composition of the core 104 may further contain an additive such as a vulcanization aid, an anti-aging agent, an antioxidant, a light stabilizer, a softener, a processing aid, a coloring agent, or the like as long as the effect of the present invention is not hindered.

A method for producing the rubber composition is not particularly limited as long as the object of the present invention is achieved. The production method and the production conditions described above for the first embodiment may be used.

A method for producing the tennis ball 102 including the core 104 obtained by using the rubber composition is not particularly limited. The production method and the production conditions described above for the first embodiment may be used.

EXAMPLES

The following will show the effects of the present invention by means of Examples, but the present invention should not be construed in a limited manner on the basis of the description of these Examples Experiment 1

Example I-1

Firstly, 1.6 parts by weight of sodium naphthalenesulfonate-formaldehyde condensate (trade name "Tamol NN9104" manufactured by BASF) and 0.6 parts by weight of aromatic polyglycol ether (trade name "Emulvin WA" manufactured by LANXCESS) were dissolved in 100 parts by weight of purified water, and were adjusted such that the pH was not lower than 8.0 and not higher than 12.0, by using commercially available ammonia water (28% by weight), to prepare a dispersion medium. Next, the above-described dispersion medium was added to each of titanium oxide (trade name "A220" manufactured by ISHIHARA SANGYO KAISHA, LTD.), zinc oxide (trade name "Zinc Oxide II" manufactured by SEIDO CHEMICAL INDUSTRY CO., LTD.), sulfur (trade name "SANFEL EX" manufactured by SANSHIN CHEMICAL INDUSTRY CO., LTD.), and N-cyclohexyl-2-benzothiazole sulfenamide (CBS, vulcanization accelerator manufactured by SANSHIN CHEMICAL INDUSTRY CO., LTD., trade name "SANCELER CM"), and the obtained product was stirred by using a ball mill for eight hours or longer. Thereafter, the pH was adjusted to be not lower than 8.0 and not higher than 12.0 by using the above-described ammonia water, to obtain a slurry (solid content concentration of 40% by weight) of the titanium oxide, a slurry (solid content concentration of 40% by weight) of the zinc oxide, a slurry (solid content concentration of 40% by weight) of (20% oil-containing) sulfur, and a slurry (solid content concentration of 20% by weight) of the CBS. Finally, 38 parts by weight of the titanium oxide slurry, 8 parts by weight of the zinc oxide slurry, 2 parts by weight of the sulfur slurry, 2 parts by weight of the CBS slurry, and 0.05 parts by weight of a vulcanization acceleration aid (aid 1) (ammonium acetate manufactured by Wako Pure Chemical Industries, Ltd., purity of 97%) were added to 100 parts by weight of natural rubber latex (trade name "HYTEX-HA" available from Nomura Trading Co., Ltd., solid content concentration of 60% by weight) and uniformly mixed, to produce an aqueous adhesive of Example I-1. The aid 1 (ammonium acetate) was previously added to any of the slurries and sufficiently stirred and mixed so as to blend a predetermined amount of the aid 1, and was thereafter added to the natural rubber latex.

Examples I-2 to I-4 and I-6 to I-16, and Comparative Examples I-1 to I-10

Aqueous adhesives of Examples I-2 to I-4 and I-6 to I-16 and Comparative Examples I-1 to I-10 were each produced in the same manner as in Example 1 except that the blended amount of the latex, the slurry, or purified water was changed to that indicated below in Tables 1 to 5.

Example I-5

In Example I-5, 107 g of water was previously added to 10 g of ammonia water (manufactured by Wako Pure Chemical Industries, Ltd., concentration of 28% by weight), and cooled to 10° C. or lower, and 9.88 g of acetic acid (manufactured by Wako Pure Chemical Industries, Ltd., purity of 99.7%) was then added thereto, to prepare aqueous solution of ammonium acetate at a concentration of 10% by weight. An aqueous adhesive of Example I-5 was produced in the same manner as in Example I-1 except that the blended amount of the latex, the slurry, or purified water was changed to that indicated below in Table I-1, and 2 parts by weight of the aqueous solution of ammonium acetate described above was added as a vulcanization acceleration aid (aid 2).

TABLE 1

Table I-1 (parts by weight)

| | Ex. I-1 | Ex. I-2 | Ex. I-3 | Ex. I-4 | Ex. I-5 | Comp. Ex. I-1 |
|---|---|---|---|---|---|---|
| Latex | | | | | | |
| Natural rubber (60 wt. %) | 100 | 100 | 100 | 100 | 100 | 100 |
| SB rubber (50 wt. %) | 0 | 0 | 0 | 0 | 0 | 0 |
| Slurry | | | | | | |
| Titanium oxide (40 wt. %) | 38 | 38 | 38 | 38 | 38 | 38 |
| Silica (40 wt. %) | 0 | 0 | 0 | 0 | 0 | 0 |
| Zinc oxide (40 wt. %) | 8 | 8 | 8 | 8 | 8 | 8 |
| Sulfur (40 wt. %) | 6 | 6 | 6 | 6 | 6 | 6 |
| CBS (20 wt. %) | 3 | 3 | 3 | 3 | 3 | 3 |
| TBBS (20 wt. %) | 0 | 0 | 0 | 0 | 0 | 0 |
| MBS (20 wt. %) | 0 | 0 | 0 | 0 | 0 | 0 |
| Aid 1 (100 wt. %) | 0.05 | 0.2 | 1 | 0 | 0 | 0 |
| Aid 2 (10 wt.) | 0 | 0 | 0 | 0 | 2 | 0 |
| Aid 3 (100 wt.) | 0 | 0 | 0 | 0.5 | 0 | 0 |
| Purified water | 0 | 0 | 0 | 0 | 0 | 0 |
| Total | 155.1 | 155.2 | 156.0 | 155.5 | 157.0 | 155.0 |

TABLE 2

Table I-2 (parts by weight)

| | Ex. I-6 | Comp. Ex. I-2 | Ex. I-7 | Comp. Ex. I-3 | Ex. I-8 | Comp. Ex. I-4 |
|---|---|---|---|---|---|---|
| Latex | | | | | | |
| Natural rubber (60 wt. %) | 100 | 100 | 100 | 100 | 100 | 100 |
| SB rubber (50 wt. %) | 0 | 0 | 0 | 0 | 0 | 0 |
| Slurry | | | | | | |
| Titanium oxide (40 wt. %) | 38 | 38 | 38 | 38 | 38 | 38 |
| Silica (40 wt. %) | 0 | 0 | 0 | 0 | 0 | 0 |
| Zinc oxide (40 wt. %) | 8 | 8 | 8 | 8 | 8 | 8 |
| Sulfur (40 wt. %) | 6 | 6 | 6 | 6 | 6 | 6 |
| CBS (20 wt. %) | 1 | 1 | 12 | 12 | 0 | 0 |
| TBBS (20 wt. %) | 0 | 0 | 0 | 0 | 3 | 3 |
| MBS (20 wt. %) | 0 | 0 | 0 | 0 | 0 | 0 |
| Aid 1 (100 wt. %) | 0.2 | 0 | 0.2 | 0 | 0.2 | 0 |
| Aid 2 (10 wt.) | 0 | 0 | 0 | 0 | 0 | 0 |
| Aid 3 (100 wt.) | 0 | 0 | 0 | 0 | 0 | 0 |
| Purified water | 0 | 0 | 0 | 0 | 0 | 0 |
| Total | 153.2 | 153.0 | 164.2 | 164.0 | 155.2 | 155.0 |

TABLE 3

Table I-3 (parts by weight)

| | Ex. I-9 | Comp. Ex. I-5 | Ex. I-10 | Comp. Ex. I-6 | Ex. I-11 | Comp. Ex. I-7 |
|---|---|---|---|---|---|---|
| Latex | | | | | | |
| Natural rubber (60 wt. %) | 100 | 100 | 0 | 0 | 100 | 100 |
| SB rubber (50 wt. %) | 0 | 0 | 100 | 100 | 0 | 0 |
| Slurry | | | | | | |
| Titanium oxide (40 wt. %) | 38 | 38 | 38 | 38 | 110 | 110 |
| Silica (40 wt. %) | 0 | 0 | 0 | 0 | 0 | 0 |
| Zinc oxide (40 wt. %) | 8 | 8 | 8 | 8 | 8 | 8 |
| Sulfur (40 wt. %) | 6 | 6 | 6 | 6 | 6 | 6 |
| CBS (20 wt. %) | 0 | 0 | 3 | 3 | 3 | 3 |
| TBBS (20 wt. %) | 0 | 0 | 0 | 0 | 0 | 0 |
| MBS (20 wt. %) | 3 | 3 | 0 | 0 | 0 | 0 |
| Aid 1 (100 wt. %) | 0.2 | 0 | 0.2 | 0 | 0.2 | 0 |

TABLE 3-continued

Table I-3 (parts by weight)

|  | Ex. I-9 | Comp. Ex. I-5 | Ex. I-10 | Comp. Ex. I-6 | Ex. I-11 | Comp. Ex. I-7 |
|---|---|---|---|---|---|---|
| Aid 2 (10 wt.) | 0 | 0 | 0 | 0 | 0 | 0 |
| Aid 3 (100 wt.) | 0 | 0 | 0 | 0 | 0 | 0 |
| Purified water | 0 | 0 | 0 | 0 | 0 | 0 |
| Total | 155.2 | 155.0 | 155.2 | 155.0 | 227.2 | 227.0 |

TABLE 4

Table I-4 (parts by weight)

|  | Ex. I-12 | Comp. Ex. I-8 | Ex. I-13 | Comp. Ex. I-9 | Ex. I-14 | Comp. Ex. I-10 |
|---|---|---|---|---|---|---|
| Latex | | | | | | |
| Natural rubber (60 wt. %) | 100 | 100 | 100 | 100 | 100 | 100 |
| SB rubber (50 wt. %) | 0 | 0 | 0 | 0 | 0 | 0 |
| Slurry | | | | | | |
| Titanium oxide (40 wt. %) | 10 | 10 | 38 | 38 | 0 | 38 |
| Silica (40 wt. %) | 20 | 20 | 0 | 0 | 0 | 0 |
| Zinc oxide (40 wt. %) | 8 | 8 | 8 | 8 | 8 | 8 |
| Sulfur (40 wt. %) | 6 | 6 | 6 | 6 | 6 | 6 |
| CBS (20 wt. %) | 0 | 0 | 3 | 3 | 3 | 3 |
| TBBS (20 wt. %) | 3 | 3 | 0 | 0 | 0 | 0 |
| MBS (20 wt. %) | 0 | 0 | 0 | 0 | 0 | 0 |
| Aid 1 (100 wt. %) | 0.2 | 0 | 0.2 | 0 | 0.2 | 0 |
| Aid 2 (10 wt.) | 0 | 0 | 0 | 0 | 0 | 0 |
| Aid 3 (100 wt.) | 0 | 0 | 0 | 0 | 0 | 0 |
| Purified water | 0 | 0 | 1500 | 1500 | 2000 | 2000 |
| Total | 147.2 | 147.0 | 1655.2 | 1655.0 | 2117.2 | 2155.0 |

TABLE 5

Table I-5 (parts by weight)

|  | Ex. I-15 | Ex. I-16 | Comp. Ex. I-1 |
|---|---|---|---|
| Latex | | | |
| Natural rubber (60 wt. %) | 100 | 100 | 100 |
| SB rubber (50 wt. %) | 0 | 0 | 0 |
| Slurry | | | |
| Titanium oxide (40 wt. %) | 38 | 38 | 38 |
| Silica (40 wt. %) | 0 | 0 | 0 |
| Zinc oxide (40 wt. %) | 8 | 8 | 8 |
| Sulfur (40 wt. %) | 6 | 6 | 6 |
| CBS (20 wt. %) | 3 | 3 | 3 |
| TBBS (20 wt. %) | 0 | 0 | 0 |
| MBS (20 wt. %) | 0 | 0 | 0 |
| Aid 1 (100 wt. %) | 0.01 | 4.25 | 0 |
| Aid 2 (10 wt.) | 0 | 0 | 0 |
| Ad 3 (100 wt.) | 0 | 0 | 0 |
| Purified water | 0 | 0 | 0 |
| Total | 155.0 | 159.3 | 155.0 |

Details of the compounds indicated in Tables I-1 to I-5 are as follows.

Natural rubber: natural rubber latex available from Nomura Trading Co., Ltd., trade name "HYTEX-HA" (solid content concentration of 60% by weight)

SB rubber: styrene-butadiene rubber latex manufactured by JSR Corporation (solid content concentration of 50% by weight)

Titanium oxide: trade name "A220" manufactured by ISHIHARA SANGYO KAISHA, LTD.

Silica: trade name "Nipsil VN3" manufactured by TOSOH SILICA CORPORATION

Zinc oxide: trade name "Zinc Oxide II" manufactured by SEIDO CHEMICAL INDUSTRY CO., LTD.

Sulfur: insoluble sulfur manufactured by SANSHIN CHEMICAL INDUSTRY CO., LTD., trade name "SANFEL EX", containing 20% oil CBS: vulcanization accelerator manufactured by SANSHIN CHEMICAL INDUSTRY CO., LTD., N-cyclohexyl-2-benzothiazole sulfenamide, trade name "SANCELER CM"

TBBS: vulcanization accelerator manufactured by SANSHIN CHEMICAL INDUSTRY CO., LTD., N-(t-butyl)-2-benzothiazole sulfenamide, trade name "SANCELER NS"

MBS: vulcanization accelerator manufactured by SANSHIN CHEMICAL INDUSTRY CO., LTD., N-oxydiethylene-2-benzothiazole sulfenamide, trade name "SANCELER NOB"

Aid 1: ammonium acetate manufactured by Wako Pure Chemical Industries, Ltd., purity of 97%

Aid 2: prepared aqueous ammonium acetate solution (concentration of 10% by weight)

Aid 3: ammonium salicylate manufactured by Wako Pure Chemical Industries, Ltd., purity of 98%

[Viscosity Measurement]

A viscosity of the aqueous adhesive of each of Examples I-1 to I-16 and Comparative Examples I-1 to I-10 was measured by using a Brookfield rotational viscometer (TVC-10 viscometer manufactured by Toki Sangyo Co., Ltd) in compliance with the description in JIS Z8803 "Methods for viscosity measurement of liquid". An average of values obtained by three measurements at a temperature of 23±1° C. at 20 rpm is indicated below as each viscosity (cps) in Tables I-6 to I-10.

[pH measurement]

A pH of the aqueous adhesive of each of Examples I-1 to I-16 and Comparative Examples I-1 to I-10 was measured at the temperature of 23° C. by using a pH meter (TPX-999 manufactured by Toko Chemical Laboratories Co., Ltd.). An average of values obtained by three measurements in each example is indicated below as the pH in Tables I-6 to I-10.

[Measurement of 95% Torque Value]

(Production of Test Piece)

About 20 g of the aqueous adhesive of Example I-1 was put into a stainless vat, naturally dried at normal temperature for 48 hours, and thereafter dried at 50° C. under reduced pressure for three hours or longer, to obtain a test piece. A test piece of each of Examples I-2 to I-16 and Comparative Examples I-1 to I-10 was produced in the same manner.

A curing test was performed at the measurement temperature of 160° C. at an amplitude angle of ±3° at an amplitude of 100 cpm for 60 minutes by using a curelastometer (curelastometer 7 available from JSR Trading Co., Ltd.) in compliance with JIS K6300-2 "Rubber, unvulcanized-Physical property—Part 2: Determination of cure characteristics with oscillating curemeters", and a curing rate curve for each test piece was obtained. Based on the obtained curing rate curve, a 95% torque value for each example was obtained. Results for Examples I-1 to I-16 in which the ammonium-salt-based vulcanization acceleration aid was contained are each indicated below as a torque value $N_1$, and results for Comparative Examples I-1 to I-10 in which no ammonium-salt-based vulcanization acceleration aid was contained are each indicated below as a torque value $N_0$, in Tables I-6 to I-10. A ratio $N_1/N_0$ of the torque value $N_1$ for each of Examples I-1 to I-5, I-15, and I-16 to the torque value $N_0$ of Comparative Example I-1 in which the blended amounts were the same as in Examples I-1 to I-5, I-15, and I-16 except that no ammonium-salt-based vulcanization acceleration aid was contained in Comparative Example I-1 is indicated below in Tables I-6 and I-10. Similarly, the ratios $N_1/N_0$ of torque values in Examples I-6 to I-14 to the respective torque values in Comparative Examples I-2 to I-10 in which the blended amounts were the same as in Examples I-6 to I-14, respectively, except that no ammonium-salt-based vulcanization acceleration aid was contained in Comparative Examples I-2 to I-10, were calculated, and are indicated below in Tables I-7 to I-9.

[Adhesive Force]

(Production of Test Core)

100 parts by weight of natural rubber (trade name "SMR CV60" available from Astlett Rubber Inc.), 15 parts by weight of carbon black (trade name "N330" manufactured by Cabot Japan K.K.), 4 parts by weight of silica (trade name "Nipsil VN3" manufactured by TOSOH SILICA CORPORATION), 30 parts by weight of kaolin clay (trade name "ECKALITE 120" manufactured by Imerys), 17 parts by weight of magnesium carbonate (trade name "GOLD STAR" manufactured by Konoshima Chemical Co., Ltd.), and 5 parts by weight of zinc oxide (trade name "Zinc Oxide II" manufactured by SEIDO CHEMICAL INDUSTRY CO., LTD.) were put into a Banbury mixer, and kneaded at 90° C. for five minutes. To the obtained kneaded product, 0.5 parts by weight of salicylic acid (manufactured by Tokyo Chemical Industry Co., Ltd.), 2.3 parts by weight of 1,3-diphenylguanidine (trade name "SANCELER D" manufactured by SANSHIN CHEMICAL INDUSTRY CO., LTD.), and 3.5 parts by weight of sulfur (the above-described trade name "SANFEL EX") were added, and kneaded by using an open roll at 50° C. for three minutes, to obtain a rubber composition.

The obtained rubber composition was put into a mold and pressed at 140° C. for four minutes, to form two half cores. The edge portion of each half core was treated with sand paper (#100), and the aqueous adhesive of Example I-1 was thereafter applied to the edge portion and dried at room temperature for two hours or longer. Thereafter, 0.5 ml of water was put into one of the half cores, the one of the half cores was thereafter adhered to the other of the half cores, and the adhered half cores were heated at 150° C. for six minutes, to produce a test core 1. Similarly, the aqueous adhesives of Examples I-2 to I-16 and Comparative Examples I-1 to I-10 were used to produce test cores I-2 to I-16 and comparative test cores I-1 to I-10.

(Tensile Test)

Ten dumbbell pieces (thickness of 2 mm) of JIS No. 3 were cut out as test pieces from each of the test cores I-1 to I-16 and the comparative test cores I-1 to I-10. At this time, each test piece was cut out such that the adhesion surfaces of the two half cores were located at the center portion of the dumbbell piece.

A tensile test of each test piece was conducted at a tensile speed of 500 mm/minute by using a tensile testing machine (trade name "Autograph AGS-X" manufactured by SHIMADZU CORPORATION), and the cross-section of the test piece after breakage was observed. For the ten test pieces of each example, a test piece in which a base material was broken (breakage at a portion other than the adhesion surface) was evaluated as "good", and a test piece which caused interfacial failure (breakage at any of the edge portions) or cohesive failure (breakage at the adhesive layers) was evaluated as "poor". According to the following evaluation criteria, an adhesive force (adhesive strength) was evaluated. Evaluation results are indicated below in Tables I-6 to I-10.

A: The number of test pieces determined as having "good adhesion" was not less than nine.

B: The number of test pieces determined as having "good adhesion" was seven or eight.

C: The number of test pieces determined as having "good adhesion" was not greater than six.

TABLE 6

| Table I-6 Evaluation results | | | | | | | |
|---|---|---|---|---|---|---|---|
| | | Ex. I-1 | Ex. I-2 | Ex. I-3 | Ex. I-4 | Ex. I-5 | Comp. Ex. I-1 |
| Solid content concentration | wt. % | 52.5 | 52.6 | 52.8 | 52.7 | 52.0 | 52.5 |
| Aid | wt. % | 0.06 | 0.25 | 1.21 | 0.61 | 0.25 | 0.00 |
| Inorganic filler | wt. % | 22.6 | 22.5 | 22.3 | 22.5 | 22.5 | 22.6 |
| Viscosity | cps | 115 | 115 | 116 | 116 | 114 | 115 |
| pH | | 10.6 | 10.6 | 10.5 | 10.5 | 10.5 | 10.6 |
| Torque value $N_1$ | N·m | 1.14 | 1.25 | 1.58 | 1.19 | 1.24 | — |
| Torque value $N_0$ | N·m | — | — | — | — | — | 1.10 |
| Ratio $N_1/N_0$ | | 1.04 | 1.14 | 1.44 | 1.08 | 1.13 | — |
| Adhesive force | | A | A | A | A | A | B |

TABLE 7

Table I-7 Evaluation results

|  |  | Ex. I-6 | Comp. Ex. I-2 | Ex. I-7 | Comp. Ex. I-3 | Ex. I-8 | Comp. Ex. I-4 |
|---|---|---|---|---|---|---|---|
| Solid content concentration | wt. % | 53.0 | 52.9 | 50.8 | 50.7 | 52.6 | 52.5 |
| Aid | wt. % | 0.25 | 0.00 | 0.24 | 0.00 | 0.25 | 0.00 |
| Inorganic filler | wt. % | 22.7 | 22.7 | 22.1 | 22.1 | 22.5 | 22.6 |
| Viscosity | cps | 117 | 117 | 113 | 112 | 123 | 122 |
| pH |  | 10.3 | 10.3 | 10.0 | 10.1 | 10.4 | 10.6 |
| Torque value $N_1$ | N · m | 1.07 | — | 1.54 | — | 0.99 | — |
| Torque value $N_0$ | N · m | — | 0.96 | — | 1.41 | — | 0.86 |
| Ratio $N_1/N_0$ |  | 1.11 | — | 1.09 | — | 1.15 | — |
| Adhesive force |  | A | B | B | B | A | B |

TABLE 8

Table I-8 Evaluation results

|  |  | Ex. I-9 | Comp. Ex. I-5 | Ex. I-10 | Comp. Ex. I-6 | Ex. I-11 | Comp. Ex. I-7 |
|---|---|---|---|---|---|---|---|
| Solid content concentration | wt. % | 52.6 | 52.5 | 46.1 | 46.1 | 48.6 | 48.5 |
| Aid | wt. % | 0.25 | 0.00 | 0.28 | 0.00 | 0.18 | 0.00 |
| Inorganic filler | wt. % | 22.5 | 22.6 | 25.7 | 25.8 | 42.8 | 42.8 |
| Viscosity | cps | 115 | 116 | 118 | 121 | 160 | 160 |
| pH |  | 11.1 | 11.2 | 10.5 | 10.5 | 10.8 | 10.8 |
| Torque value $N_1$ | N · m | 1.16 | — | 0.97 | — | 1.62 | — |
| Torque value $N_0$ | N · m | — | 1.02 | — | 0.91 | — | 1.54 |
| Ratio $N_1/N_0$ |  | 1.14 | — | 1.07 | — | 1.05 | — |
| Adhesive force |  | A | B | B | C | B | C |

TABLE 9

Table I-9 Evaluation results

|  |  | Ex. I-12 | Comp. Ex. I-8 | Ex. I-13 | Comp. Ex. I-9 | Ex. I-14 | Comp. Ex. I-10 |
|---|---|---|---|---|---|---|---|
| Solid content concentration | wt. % | 53.2 | 53.2 | 4.9 | 4.9 | 3.1 | 3.8 |
| Aid | wt. % | 0.26 | 0.00 | 0.25 | 0.00 | 0.30 | 0.00 |
| Inorganic filler | wt. % | 19.4 | 19.4 | 22.5 | 22.6 | 4.8 | 22.6 |
| Viscosity | cps | 140 | 140 | 31 | 31 | 30 | 30 |
| pH |  | 8.5 | 8.5 | 8.9 | 9.2 | 8.8 | 9.2 |
| Torque value $N_1$ | N · m | 1.42 | — | 1.21 | — | 1.21 | — |
| Torque value $N_0$ | N · m | — | 1.34 | — | 1.08 | — | 1.07 |
| Ratio $N_1/N_0$ |  | 1.06 | — | 1.12 | — | 1.13 | — |
| Adhesive force |  | B | C | A | B | B | C |

TABLE 10

Table I-10 Evaluation results

|  |  | Ex. I-15 | Ex. I-16 | Comp. Ex. I-1 |
|---|---|---|---|---|
| Solid content concentration | wt. % | 52.5 | 53.8 | 52.5 |
| Aid | wt. % | 0.01 | 4.96 | 0.00 |
| Inorganic filler | wt. % | 22.6 | 21.5 | 22.6 |
| Viscosity | cps | 115 | 116 | 115 |
| pH |  | 10.8 | 10.5 | 10.6 |
| Torque value $N_1$ | N · m | 1.13 | 1.62 | — |
| Torque value $N_0$ | N · m | — | — | 1.10 |
| Ratio $N_1/N_0$ |  | 1.03 | 1.47 | — |
| Adhesive force |  | B | B | B |

As indicated in Tables I-6 to I-10, the evaluation of the aqueous adhesive in each example is higher than evaluations of the aqueous adhesives in comparative examples. The evaluation result clearly indicates that the present invention is superior.

Experiment 2

Example II-1

Firstly, 1.6 parts by weight of sodium naphthalene-sulfonate-formaldehyde condensate (trade name "Tamol NN9104" manufactured by BASF) and 0.6 parts by weight of aromatic polyglycol ether (trade name "Emulvin WA" manufactured by LANXCESS) were dissolved in 100 parts by weight of purified water, and were adjusted such that the pH was not lower than 8.0 and not higher than 12.0 by using commercially available ammonia water (28% by weight), to prepare a dispersion medium. Next, the above-described dispersion medium was added to each of sulfur (trade name "SANFEL EX" manufactured by SANSHIN CHEMICAL INDUSTRY CO., LTD.) and a vulcanization accelerator CBS (trade name "SANCELER CM" manufactured by SANSHIN CHEMICAL INDUSTRY CO., LTD.), and the obtained product was stirred by using a ball mill for eight hours or longer. Thereafter, the pH was adjusted to be not lower than 8.0 and not higher than 12.0 by using the above-described ammonia water, to obtain a slurry (solid content concentration of 40% by weight) of (20% oil-containing) sulfur and a slurry (solid content concentration of 20% by weight) of the vulcanization accelerator CBS. Finally, 6 parts by weight of the sulfur slurry and 3 parts by weight of the slurry of the vulcanization accelerator CBS were added to 100 parts by weight of natural rubber latex (HYTEX-HA, solid content concentration of 60% by weight) and uniformly mixed, to produce an aqueous adhesive of Example II-1.

Comparative Example II-1

In Comparative Example II-1, a slurry (solid content concentration of 40% by weight) of titanium oxide and a slurry (solid content concentration of 40% by weight) of zinc oxide were prepared in the same manner as for the slurry (solid content concentration of 40% by weight) of (20% oil-containing) sulfur and the slurry (solid content concentration of 20% by weight) of the vulcanization accelerator CBS, which are described above in Example 1. Next, 38 parts by weight of the titanium oxide slurry, 8 parts by weight of the zinc oxide slurry, 2 parts by weight of the sulfur slurry, and 2 parts by weight of the slurry of the vulcanization accelerator CBS were added to 100 parts by weight of natural rubber latex (HYTEX-HA, solid content concentration of 60% by weight) and uniformly mixed, to produce an aqueous adhesive of Comparative Example II-1.

Examples II-2 to II-6 and Comparative Example II-2

Aqueous adhesives of Examples II-2 to II-6 and Comparative Example II-2 were each produced in the same manner as for Example II-1 except that the blended amount of the latex or each slurry was changed to that indicted below in Tables II-1 to II-2.

TABLE 11

Table II-1 (parts by weight)

| | Ex. II-1 | Comp. Ex. II-1 | Comp. Ex. II-2 | Ex. II-2 | Ex. II-3 |
|---|---|---|---|---|---|
| Latex | | | | | |
| Natural rubber (60 wt. %) | 100 | 100 | 100 | 100 | 100 |
| SB rubber (50 wt. %) | 0 | 0 | 0 | 0 | 0 |
| Slurry | | | | | |
| Titanium oxide (40 wt. %) | 0 | 38 | 38 | 0.05 | 0 |
| Zinc oxide (40 wt. %) | 0 | 8 | 8 | 0 | 0.05 |
| Sulfur (40 wt. %) | 6 | 2 | 6 | 6 | 6 |
| CBS (20 wt. %) | 3 | 2 | 3 | 3 | 3 |
| TBBS (20 wt. %) | 0 | 0 | 0 | 0 | 0 |
| MBS (20 wt. %) | 0 | 0 | 0 | 0 | 0 |
| Total | 109.0 | 150.0 | 155.0 | 109.1 | 109.1 |

TABLE 12

Table II-2 (parts by weight)

| | Ex. II-4 | Ex. II-5 | Ex. II-6 |
|---|---|---|---|
| Latex | | | |
| Natural rubber (60 wt. %) | 0 | 100 | 100 |
| SB rubber (50 wt. %) | 100 | 0 | 0 |
| Slurry | | | |
| Titanium oxide (40 wt. %) | 0 | 0 | 0 |
| Zinc oxide (40 wt. %) | 0 | 0 | 0 |
| Sulfur (40 wt. %) | 6 | 6 | 6 |
| CBS (20 wt. %) | 3 | 0 | 0 |
| TBBS (20 wt. %) | 0 | 3 | 0 |
| MBS (20 wt. %) | 0 | 0 | 3 |
| Total | 109.0 | 109.0 | 109.0 |

Details of the compounds indicated in Tables II-1 to II-2 are as follows. Solid content concentrations are indicated in parentheses on the left column in Tables II-1 to II-2.
  Natural rubber: HYTEX-HA (available from Nomura Trading Co., Ltd.) (solid content concentration of 60% by weight)
  SB rubber: styrene-butadiene rubber latex manufactured by JSR CORPORATION (solid content concentration of 50% by weight)
  Titanium oxide: trade name "A220" manufactured by ISHIHARA SANGYO KAISHA, LTD.
  Zinc oxide: trade name "Zinc Oxide II" manufactured by SEIDO CHEMICAL INDUSTRY CO., LTD.
  Sulfur: insoluble sulfur manufactured by SANSHIN CHEMICAL INDUSTRY CO., LTD., trade name "SANFEL EX", containing 20% oil
  CBS: vulcanization accelerator manufactured by SANSHIN CHEMICAL INDUSTRY CO., LTD., N-cyclohexyl-2-benzothiazole sulfenamide, trade name "SANCELER CM"
  TBBS: vulcanization accelerator manufactured by SANSHIN CHEMICAL INDUSTRY CO., LTD., N-(t-butyl)-2-benzothiazole sulfenamide, trade name "SANCELER NS"
  MBS: vulcanization accelerator manufactured by SANSHIN CHEMICAL INDUSTRY CO., LTD., N-oxydiethylene-2-benzothiazole sulfenamide, trade name "SANCELER NOB"

[Viscosity Measurement]

A viscosity of the aqueous adhesive of each of Examples II-1 to II-6 and Comparative Examples II-1 to II-2 was measured by using a Brookfield rotational viscometer (TVC-10 viscometer manufactured by Toki Sangyo Co., Ltd, rotor No. 2) in compliance with the description in JIS 28803 "Method for viscosity measurement of liquid". An average of values obtained by three measurements at a temperature of 23±1° C. at 20 rpm is indicated below as each viscosity (cps) in Tables II-3 to II-4.

[pH Measurement]

A pH of the aqueous adhesive of each of Examples II-1 to II-6 and Comparative Examples II-1 to II-2 was measured at the temperature of 23° C. by using a pH meter (TPX-999 manufactured by Toko Chemical Laboratories Co., Ltd.). An average of values obtained by three measurements in each example is indicated below as the pH in Tables II-3 to II-4.

[Adhesive Force]

(Production of Test Core)

100 parts by weight of natural rubber (trade name "SMR CV60" available from Astlett Rubber Inc.), 15 parts by weight of carbon black (trade name "N330" manufactured by Cabot Japan K.K.), 4 parts by weight of silica (trade name "Nipsil VN3" manufactured by TOSOH SILICA CORPORATION), 30 parts by weight of kaolin clay (trade name "ECKALITE 120" manufactured by Imerys), 17 parts by weight of magnesium carbonate (trade name "GOLD STAR" manufactured by Konoshima Chemical Co., Ltd.), and 5 parts by weight of zinc oxide (trade name "Zinc Oxide II" manufactured by SEIDO CHEMICAL INDUSTRY CO., LTD.) were put into a Banbury mixer, and kneaded at 90° C. for five minutes. To the obtained kneaded product, 0.5 parts by weight of salicylic acid (manufactured by Tokyo Chemical Industry Co., Ltd.), 2.3 parts by weight of 1,3-diphenylguanidine (trade name "SANCELER D" manufactured by SANSHIN CHEMICAL INDUSTRY CO., LTD.), and 3.5 parts by weight of sulfur (the above-described trade name "SANFEL EX") were added, and kneaded by using an open roll at 50° C. for three minutes, to obtain a rubber composition.

The obtained rubber composition was put into a mold, and pressed at 140° C. for four minutes, to form two half cores. The edge portion of each half core was treated with sand paper (#100), and the aqueous adhesive of Example II-1 was thereafter applied to the edge portion and dried at room temperature for two hours or longer. Thereafter, 0.5 ml of water was put into one of the half cores, the one of the half cores was thereafter adhered to the other of the half cores, and the adhered half cores were heated at 150° C. for six minutes, to produce a test core II-1. Similarly, the aqueous adhesives of Examples II-2 to II-6 and Comparative Examples II-1 to II-2 were used to produce test cores II-2 to II-6 and comparative test cores II-1 to II-2.

(Tensile Test)

Three dumbbell pieces (thickness of 2 mm) of JIS No. 3 were cut out as test pieces from each of the test cores II-1 to II-6 and the comparative test cores II-1 to II-2. At this time, each test piece was cut out such that the adhesion surfaces of the two half cores were located at the center portion of the dumbbell piece.

A tensile test of each test piece was conducted at a tensile speed of 500 mm/minute by using a tensile testing machine (trade name "Autograph AGS-X" manufactured by SHIMADZU CORPORATION), and the cross-section of the test piece after breakage was observed. For the three test pieces of each example, a test piece in which a base material was broken (breakage at a portion other than the adhesion surface) was evaluated as "good", and a test piece which caused interfacial failure (breakage at any of the edge portions) or cohesive failure (breakage at the adhesive layers) was evaluated as "poor", to evaluate an adhesive force (adhesive strength). The number of test pieces determined as "good" is indicated below in Tables II-3 to II-4. The greater the numerical value is, the higher the evaluation is. In a case where, among the three test pieces, the three test pieces were determined as "good", the adhesive force was evaluated as A. In a case where, among the three test pieces, two test pieces were determined as "good", the adhesive force was evaluated as B. In a case where, among the three test pieces, one test piece was determined as "good", the adhesive force was evaluated as C.

[Feel at Impact]

The aqueous adhesive of each of Examples II-1 to II-6 and Comparative Examples II-1 to II-2 was used to produce a test core for each example in the same manner as described above for the evaluation of the adhesive force. Two felt portions in which seam glue was adhered to the cross-sections were adhered to the surface of each core to produce a tennis ball.

After the production, each tennis ball was left as it was under atmospheric pressure in environments where the temperature was 20° C. and the relative humidity was 60%, for 24 hours, and was hit by 50 players with tennis rackets, and feel at impact was inquired from the players. Grading was performed as follows based on the number of the players who answered that "feel at impact was soft and preferable". The results are indicated below in Tables II-3 to II-4.

A: not less than 40 players
B: 30 to 39 players
C: not greater than 20 players

TABLE 13

Table II-3 Evaluation results

| | | Ex. II-1 | Comp. Ex. II-1 | Comp. Ex. II-2 | Ex. II-2 | Ex. II-3 |
|---|---|---|---|---|---|---|
| Solid content | wt. % | 57.8 | 53.1 | 52.5 | 57.8 | 57.8 |
| Inorganic filler | wt. % | 0.0 | 23.1 | 22.6 | 0.03 | 0.03 |
| Sulfur content | wt. % | 4.20 | 1.41 | 3.25 | 4.20 | 4.20 |
| Vulcanization accelerator | wt. % | 0.95 | 0.50 | 0.74 | 0.95 | 0.95 |
| Viscosity | cps | 110 | 200 | 210 | 110 | 110 |
| pH | — | 9.0 | 9.0 | 9.0 | 9.0 | 9.0 |
| Adhesive force | The number of good pieces | 3 | 3 | 3 | 3 | 3 |
| | — | A | A | A | A | A |
| Feel at impact | — | A | C | C | A | A |

TABLE 14

Table II-4 Evaluation results

| | | Ex. II-4 | Ex. II-5 | Ex. II-6 |
|---|---|---|---|---|
| Solid content | wt. % | 48.6 | 57.8 | 57.8 |
| Inorganic filler | wt. % | 0.0 | 0.0 | 0.0 |
| Sulfur content | wt. % | 5.00 | 4.33 | 4.26 |
| Vulcanization accelerator | wt. % | 1.13 | 0.95 | 0.95 |
| Viscosity | cps | 120 | 110 | 110 |
| pH | — | 9.5 | 9.0 | 9.0 |
| Adhesive force | The | 1 | 2 | 2 |

TABLE 14-continued

Table II-4 Evaluation results

|  | Ex. II-4 | Ex. II-5 | Ex. II-6 |
|---|---|---|---|
| number of good pieces | — | B | B | B |
| Feel at impact | — | B | A | B |

As indicated in Table II-3, the viscosity of Example II-1 was lower than that of Comparative Example II-1 in which the pH and the compositions other than the inorganic filler were the same as those of Example II-1. Furthermore, as indicated in Tables II-3 to II-4, in the aqueous adhesives of the examples, although no inorganic filler was blended or an amount of inorganic filler was very small, the adhesive force was equivalent to those of the aqueous adhesives of the comparative examples in which an amount of the inorganic filler was large. Moreover, the aqueous adhesives of the examples did not hinder soft feel at impact. The evaluation result clearly indicates that the present invention is superior.

INDUSTRIAL APPLICABILITY

The aqueous adhesive for rubber and the aqueous adhesive for a ball, which are described above, are applicable to not only tennis balls but also production of various rubber products obtained by using rubber compositions.

DESCRIPTION OF THE REFERENCE CHARACTERS 2, 102 . . . tennis ball
4, 104 . . . core
6, 106 . . . felt portion
8, 108 . . . seam portion
20, 120 . . . half core
21, 121 . . . edge portion

The invention claimed is:

1. An aqueous adhesive for a ball, the aqueous adhesive comprising rubber latex as a main component, wherein
    a content of an inorganic filler is less than 0.1% by weight in terms of solid content,
    a pH of the aqueous adhesive is not lower than 7.0 and not higher than 12.0, and
    the aqueous adhesive further comprises ammonia.

2. The aqueous adhesive according to claim 1, wherein the rubber latex is natural rubber latex and/or synthetic rubber latex.

3. The aqueous adhesive according to claim 1, which has at least one of the following features (i) and (ii):
    (i) a sulfur content is not less than 0.5% by weight and not greater than 18.0% by weight in terms of solid content;
    (ii) a viscosity measured at 23±1° C. by using a Brookfield rotational viscometer is not less than 20 cps and not greater than 20,000 cps.

4. The aqueous adhesive according to claim 1, further comprising a sulfenamide-based vulcanization accelerator, wherein
    the sulfenamide-based vulcanization accelerator is a compound represented by general formula $R^1$—S—N(—$R^2$)—$R^3$, where $R^1$, $R^2$, and $R^3$ each independently represent a hydrogen atom, linear, branched or cyclic C3 to C20 alkyl group, alkyl ether group, alkylphenyl group, nitrogen-containing heterocyclic group, sulfur-containing heterocyclic group, or nitrogen-and-sulfur-containing heterocyclic group.

5. The aqueous adhesive according to claim 4, wherein an amount of the sulfenamide-based vulcanization accelerator is not less than 0.01% by weight and not greater than 5.0% by weight in terms of solid content.

6. The aqueous adhesive according to claim 1, wherein the inorganic filler is one or more selected from the group consisting of silica, carbon black, calcium carbonate, calcium hydroxide, mica, magnesium hydroxide, diatomaceous earth, titanium oxide, zinc oxide, bismuth oxide, barium sulfate, talc, magnesium carbonate, and alumina.

7. A production method for producing the aqueous adhesive according to claim 1, the production method comprising:
    adding a dispersant to water and preparing a dispersion medium;
    putting and mixing an additive to be blended with rubber latex, in the dispersion medium, and thereafter adjusting a pH through addition of ammonia water such that the pH is not lower than 8.0 and not higher than 12.0, to obtain a slurry of the additive, and
    adding the slurry of the additive obtained in the slurry obtaining step to the rubber latex, and mixing the slurry and the rubber latex.

8. A ball comprising a hollow core obtained by crosslinking a rubber composition that contains a vulcanizing agent, wherein
    the core is formed of two hemispherical half cores, and
    the two half cores are adhered to each other by using the aqueous adhesive according to claim 1.

9. The aqueous adhesive according to claim 1, wherein a viscosity measured at 23±1° C. by using a Brookfield rotational viscometer is not less than 20 cps and not greater than 120 cps.

10. An aqueous adhesive for a ball, the aqueous adhesive comprising rubber latex as a main component, wherein
    a content of an inorganic filler is not greater than 0.1% by weight in terms of solid content,
    a pH of the aqueous adhesive is not lower than 7.0 and not higher than 12.0,
    the aqueous adhesive further comprises ammonia, and
    a viscosity measured at 23±1° C. by using a Brookfield rotational viscometer is not less than 20 cps and not greater than 120 cps.

* * * * *